United States Patent
Kito et al.

(10) Patent No.: US 8,100,482 B2
(45) Date of Patent: Jan. 24, 2012

(54) BRAKE HYDRAULIC PRESSURE CONTROL APPARATUS FOR VEHICLE

(75) Inventors: Yoshiaki Kito, Nagoya (JP); Katsuo Obai, Anjo (JP); Masato Terasaka, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 992 days.

(21) Appl. No.: 11/756,761

(22) Filed: Jun. 1, 2007

(65) Prior Publication Data
US 2007/0290552 A1 Dec. 20, 2007

(30) Foreign Application Priority Data
Jun. 20, 2006 (JP) ................................. 2006-169668

(51) Int. Cl.
*B60T 8/60* (2006.01)
(52) U.S. Cl. ........................................ 303/148; 303/149
(58) Field of Classification Search .................... 303/148
See application file for complete search history.

(56) References Cited

U.S. PATENT DOCUMENTS

| | | | | |
|---|---|---|---|---|
| 5,118,168 A | * | 6/1992 | Arikawa | 303/148 |
| 5,927,830 A | * | 7/1999 | Tozu et al. | 303/155 |
| 6,238,019 B1 | * | 5/2001 | Okazaki et al. | 303/146 |
| 6,345,869 B1 | * | 2/2002 | Matsuo et al. | 303/116.1 |
| 6,672,687 B2 | * | 1/2004 | Nishio | 303/122.09 |
| 6,863,355 B2 | * | 3/2005 | Nishio et al. | 303/140 |
| 2001/0013723 A1 | * | 8/2001 | Takemasa et al. | 303/177 |
| 2002/0180267 A1 | * | 12/2002 | Hara et al. | 303/187 |
| 2006/0049687 A1 | * | 3/2006 | Iizuka et al. | 303/11 |

FOREIGN PATENT DOCUMENTS
JP 2003-019952 A 1/2003
* cited by examiner

*Primary Examiner* — Robert Siconolfi
*Assistant Examiner* — Stephen Bowes
(74) *Attorney, Agent, or Firm* — Buchanan Ingersoll & Rooney PC

(57) ABSTRACT

A brake hydraulic pressure control apparatus for a vehicle includes anti-skid control means for executing an anti-skid control including a pressure reducing control and a pressure increasing control for one of front wheels at which an anti-skid control start condition is established, yaw moment control means for executing a yaw moment control, while the anti-skid control has been executed only for a first front wheel, for a second front wheel, wheel cylinder pressure estimated value calculating means, pressure difference estimated value calculating means, pressure increasing control means, and the pressure difference estimated value calculating means including pressure difference at specific time calculating means for calculating a pressure difference estimated value at specific time on the basis of a pressure difference estimated value at the first front wheel and a wheel cylinder pressure difference between the wheel cylinder pressure estimated values at the second front wheel and the first front wheel.

14 Claims, 16 Drawing Sheets

BRAKE HYDRAULIC PRESSURE CONTROL APPARATUS FOR VEHICLE

CROSS REFERENCE TO RELATED APPLICATIONS

This application is based on and claims priority under 35 U.S.C. §119 to Japanese Patent Application 2006-169668 filed on Jun. 20, 2006, the entire content of which is incorporated herein by reference.

FIELD OF THE INVENTION

The present invention relates to a brake hydraulic pressure control apparatus for a vehicle for executing an anti-skid control (hereinafter referred to as an ABS control) for preventing a vehicle wheel from slipping excessively.

BACKGROUND

A brake fluid pressure control apparatus for executing an ABS control by controlling a brake fluid pressure (hereinafter referred to as a wheel cylinder pressure) within a wheel cylinder has been mounted to a wide variety of vehicles. Such brake fluid pressure control apparatus generally includes a normally opened solenoid valve (pressure increasing valve) and a normally closed solenoid valve (pressure reducing valve), the normally opened solenoid valve being provided at a hydraulic pressure circuit connecting the master cylinder to the wheel cylinder and the normally closed solenoid valve being provided at a hydraulic pressure circuit connecting the wheel cylinder to the reservoir. In this configuration, a pressure reducing control, a sustaining control and a pressure increasing control for the wheel cylinder pressure are executed by controlling the pressure increasing valve and the pressure reducing valve respectively.

The ABS control is generally started and executed for the vehicle wheel at which a predetermined ABS control start condition is established. Specifically, the ABS control is achieved by executing the pressure increasing control at least after the pressure reducing control is executed. Then, on the pressure increasing control during the ABS control, when the ABS control start condition is established again, the executing pressure increasing control is terminated, at the same time a next ABS control (a pressure reducing control of a next ABS control) is continuously started.

Generally, plural ABS controls are executed in succession over plural control cycles, one of which is a time period between a point at which the ABS control start condition is established and a point at which the next ABS control start condition is established.

Recently, a smooth (linear) control increasing the wheel cylinder pressure has been in demand. Hereinafter, such control will be referred to as a linear pressure increasing control in this specification. In order to cope with this situation, as disclosed in JP2003-19952A, a linear solenoid valve, especially a normally opened linear solenoid valve, has been adopted as a pressure increasing valve for the brake fluid pressure control apparatus. Specifically, such linear solenoid valve can linearly control a value, which is obtained by subtracting a wheel cylinder pressure from the master cylinder pressure, by linearly controlling a conducting electric current value.

When the normally opened linear solenoid valve is used, a pressure difference corresponding to a suction force varies in proportion to the conducting electric current value (command current). Hereinafter such pressure difference will be referred to as a command pressure difference in this specification. Accordingly, the normally opened linear solenoid valve serving as the pressure increasing valve is controlled so as to: disconnect the hydraulic pressure circuit between the master cylinder and the wheel cylinder, when the command pressure difference determined in accordance with the conducting electric current value is larger than an actual pressure difference; and connect the hydraulic pressure circuit between the master cylinder and the wheel cylinder, when the command pressure difference is smaller than the actual pressure difference.

In other words, in a condition where the pressure reducing valve is maintained in a closed state, when the command pressure difference is larger than the actual pressure difference, the wheel cylinder pressure is sustained. Further, when the command pressure difference is smaller than the actual pressure difference, because the brake fluid flows from the master cylinder into the wheel cylinder, the wheel cylinder pressure increases, at the same time, the actual pressure difference is reduced, and when the actual pressure difference becomes equal to the command pressure difference, the actual pressure difference and the command pressure difference are balanced.

Specifically, in order to obtain a smooth increase of the wheel cylinder pressure immediately after a starting point of the linear pressure increasing control by use of the normally opened linear solenoid value serving as the pressure increasing valve, while the pressure reducing valve is maintained in a closed state, at the starting point of the linear pressure increasing control, the conducting electric current value of the normally opened linear solenoid valve (pressure increasing valve) is set to an electric current value corresponding to the actual pressure difference, and subsequently the conducting electric current value needs to be reduced in a constant slope. The electric current value is a conducting electric current value for controlling the command pressure difference so as to agree with the actual pressure difference (hereinafter referred to as an actual pressure difference equivalent to a current value). Thus, from the starting point of the linear pressure increasing control, the actual pressure difference is smoothly reduced, as a result, during the linear pressure increasing control, the wheel cylinder pressure can be smoothly increased.

On the other hand, when a value of the conducting electric current value, which is reduced during the linear pressure increasing control at the starting point of the linear pressure increasing control, is set to be larger than the actual pressure difference equivalent to a current value, during a period between the starting point of the linear pressure increasing control and a point at which the command pressure difference, which has been reduced, becomes equal to the actual pressure difference, the normally opened linear solenoid value is maintained in a closed state in order to sustain the wheel cylinder pressure. Specifically, a start of increase of the wheel cylinder pressure may delay. This delay will be referred to as an increase start delay of the wheel cylinder pressure.

Further, when a value of the conducting electric current value, which is reduced during the linear pressure increasing control, is set at the starting point of the linear pressure increasing control to a value that is smaller than the actual pressure difference equivalent to a current value, during a period in which the value of the actual pressure difference is reduced due to the brake fluid flowing from the master cylinder to the wheel cylinder so as to be equal to the command pressure difference, the normally opened linear solenoid value is maintained in an opened state, so that the wheel cylinder pressure rapidly increases. This rapid increase will be referred to as a rapid increase of the wheel cylinder pressure.

Thus, in order to smoothly increase the wheel cylinder pressure immediately after the starting point of the linear pressure increasing control, an actual pressure difference equivalent to a current value, at the starting point of the linear pressure increasing control (the actual pressure difference at the starting point of the linear pressure increasing control), needs to be accurately calculated. This actual pressure difference can be detected by means of a sensor for detecting the master cylinder pressure, or by means of both of a sensor for detecting the wheel cylinder pressure and the sensor for detecting the master cylinder pressure. However, because such configuration using the two sensors may increase the production cost of the apparatus and make it difficult to secure reliability of the sensors, the configuration using two sensors may not be generally acceptable.

Accordingly, there was a need to accurately estimate an actual pressure difference during the ABS control without using the abovementioned sensor, and various types of methods for accurately estimating the actual pressure difference during the ABS control without using the abovementioned sensor have been proposed so far.

When the vehicle is driven on a road (hereinafter referred to as a split road) having two types of road surfaces, one road surface including a high friction property (hereinafter referred to as a high μ road surface) and the other surface including a low friction property (hereinafter referred to as a low μ road surface), and one of right and left wheels contacts the high μ road surface, and the other of the right and left wheels contacts the low μ road surface, and in this situation, suppose the driver makes a relatively strong braking operation; the ABS control is started and executed on the front wheels contacting the low μ road surface (hereinbelow referred to as a low μ side front wheel), and then the ABS control is also started and executed on the front wheel contacting the high μ road surface (hereinbelow referred to as a high μ side front wheel).

In this situation, a control is executed for restraining the increase of the wheel cylinder pressure at the high μ side front wheel, at which the ABS controls has not been started, during a time period between a point in time at which the ABS control is started at the low μ side front wheel and another point in time at which the ABS control is started at the high μ side front wheel, in other words in a time period during which the ABS control has been executed only at the low μ side front wheel, and this control has been widely known and will be referred to as a yaw moment control in the specification. Because of this yaw moment control, a yawing moment generated due to a difference between a braking force (a friction force between a tire and a road surface) generated at the right front wheel and a braking force generated at the left front wheel is reduced, the vehicle can be prevented from being driven under an unstable condition.

Specifically, in a case where the yaw moment control is executed, as the brake fluid pressure control for the high μ side front wheel, the yaw moment control will be executed first, and then the ABS control will be executed instead of the yaw moment control.

In this embodiment, a method is provided for accurately estimating an actual pressure difference at the high μ side front wheel during the ABS control is executed for the high μ side front wheel, when the brake fluid pressure control for the high μ side front wheel is changed from the yaw moment control to the ABS control.

A need thus exists to provide a brake fluid pressure control apparatus for appropriately estimating a pressure difference between the master cylinder pressure and the wheel cylinder pressure at the second front wheel, which is under the ABS control, in a case where the brake fluid pressure control for the second front wheel is changed from the yaw moment control to the ABS control while the first front wheel is under the ABS control.

SUMMARY OF THE INVENTION

According to an aspect of the present invention, a brake hydraulic pressure control apparatus for a vehicle includes anti-skid control means for executing an anti-skid control for at least two front wheels respectively multiple times continuously, the anti-skid control alternately executing a pressure reducing control and a pressure increasing control for at least one of the front wheels at which an anti-skid control start condition is established, the pressure reducing control reducing a wheel cylinder pressure within a wheel cylinder and the pressure increasing control increasing the wheel cylinder pressure within the wheel cylinder, yaw moment control means for executing a yaw moment control, while the anti-skid control has been executed only for a first front wheel, for a second front wheel, at which the anti-skid control has not been executed, in order to restrain increase of the wheel cylinder pressure, the first front wheel being one of the front wheels, and the second front wheel being the other of the front wheels, wheel cylinder pressure estimated value calculating means for calculating a wheel cylinder pressure estimated value at the wheel where the anti-skid control has been executed, pressure difference estimated value calculating means for calculating a pressure difference estimated value between a master cylinder pressure and the wheel cylinder pressure at the wheel where the anti-skid control has been executed, on the basis of at least the calculated wheel cylinder pressure estimated value, pressure increasing control means for executing the pressure increasing control on the basis of the pressure difference estimated value, and the pressure difference estimated value calculating means including pressure difference at specific time calculating means for calculating a pressure difference estimated value at specific time, which is a pressure difference estimated value of the second front wheel at a specific time, on the basis of a pressure difference estimated value at the first front wheel calculated by the pressure difference estimated value calculating means and a wheel cylinder pressure difference between the wheel cylinder pressure estimated value at the second front wheel and the wheel cylinder pressure estimated value at the first front wheel, which are calculated by the wheel cylinder pressure estimated value calculating means, while the wheels are in a both front wheels anti-skid control state where the anti-skid control is started and executed for the second front wheel, in addition to the first front wheel, when the anti-skid control start condition is established at the second front wheel at which the yaw moment control has been executed.

According to another aspect of the present invention, a brake hydraulic pressure control apparatus for a vehicle, which is applied to a control unit having: a pressure increasing valve serving as a solenoid valve provided at a first hydraulic pressure circuit existing between a wheel cylinder and a master cylinder, which generates a master cylinder pressure on the basis of a braking operation executed by a driver; and a pressure reducing valve serving as the solenoid valve provided at a second hydraulic pressure circuit existing between the wheel cylinder and a reservoir, includes: anti-skid control means for executing an anti-skid control for at least two front wheels respectively multiple times continuously, the anti-skid control alternately executing a pressure reducing control and a pressure increasing control for at least one of the front wheels at which an anti-skid control start condition is established, the pressure reducing control reducing a wheel cylinder pressure within a wheel cylinder by controlling the pressure increasing valve and the pressure reducing valve and the pressure increasing control increasing the wheel cylinder pressure within the wheel cylinder, after the pressure reducing control is executed, by controlling the pressure increasing valve, while the pressure reducing valve is maintained in a closed state; yaw moment control means for executing a yaw moment control, when a yaw moment control start condition including a case where the anti-skid control is executed only for a first front wheel is established, for a second front wheel, at which the anti-skid control has not been executed, in order to restrain increase of the wheel cylinder pressure, the first front wheel being one of the front wheels, and the second front wheel being the other of the front wheels by controlling the pressure increasing valve and the pressure reducing valve; the anti-skid control means including wheel cylinder pressure estimated value calculating means for calculating a wheel cylinder pressure estimated value at the wheel where the anti-skid control has been executed, pressure difference estimated value calculating means for calculating a pressure difference estimated value between a master cylinder pressure and the wheel cylinder pressure at the wheel where the anti-skid control has been executed, on the basis of at least the calculated wheel cylinder pressure estimated value, and pressure increasing control means for controlling the pressure increasing valve during the pressure increasing control on the basis of the pressure difference estimated value; and the pressure difference estimated value calculating means including pressure difference at specific time calculating means for calculating a pressure difference estimated value at specific time, which is a pressure difference estimated value of the second front wheel at a specific time, on the basis of a pressure difference estimated value at the first front wheel calculated by the pressure difference estimated value calculating means and a wheel cylinder pressure difference between the wheel cylinder pressure estimated value at the second front wheel and the wheel cylinder pressure estimated value at the first front wheel, which are calculated by the wheel cylinder pressure estimated value calculating means, while the wheels are in a both front wheels anti-skid control state where the anti-skid control is started and executed for the second front wheel, in addition to the first front wheel, when the anti-skid control start condition is established at the second front wheel at which the yaw moment control has been executed.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
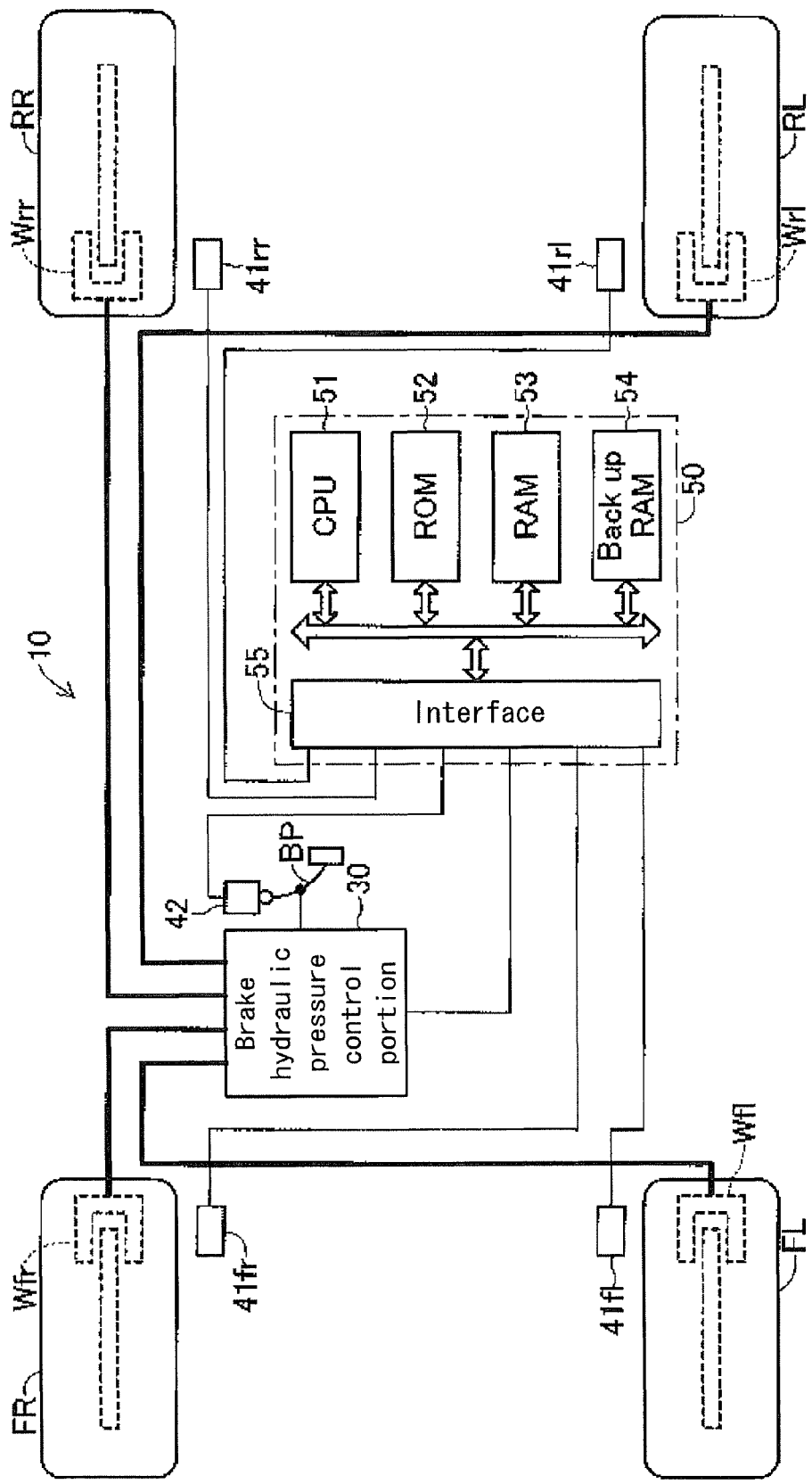
FIG. 1 illustrates a schematic diagram of a vehicle to which a brake apparatus for a vehicle having a brake hydraulic pressure control apparatus for a vehicle, related to the embodiment of the present invention, is mounted.

A brake fluid pressure control apparatus according to the disclosed subject matter is applied to the control unit having, for example, the pressure increasing valve and the pressure reducing valve.

A solenoid valve being selectively controlled to be opened or closed in accordance with the conducting electric current value or a linear solenoid valve for linearly adjusting the pressure difference in accordance with the conducting electric current value may be used as the pressure increasing valve and/or the pressure reducing valve.

Further, a normally opened solenoid valve (a solenoid valve being opened when the conducting electric current value is equal to "0") and a normally closed solenoid valve (a solenoid valve being in a closed state when the conducting electric current value is equal to "0") may be used as the pressure increasing valve and/or the pressure reducing valve.

Thus, because the pressure increasing valve is generally maintained in an opened state, and the pressure reducing valve is generally maintained in a closed state, it is possible to use the normally opened solenoid valve as the pressure increasing valve and the normally closed solenoid valve as the pressure reducing valve in order to achieve reducing energy consumption thereat and increasing durability thereof.

The brake fluid pressure control apparatus related to the disclosed subject matter includes an anti-skid control means and a yaw moment control means.

The anti-skid control means starts and executes the ABS control for a wheel at which an ABS control start condition is established. Specifically, the anti-skid control means executes the ABS control for at least one of the right and left wheels respectively, and the ABS control is sequentially repeated multiple times. The ABS control includes a pressure reducing control for reducing the wheel cylinder pressure and the pressure increasing control for increasing the wheel cylinder pressure, and these controls are alternately repeated.

The ABS control may include a sustaining control executed between the pressure reducing control and the pressure increasing control. Further, in accordance with an establishment of the ABS control start condition, the pressure reducing control may be executed first, or the sustaining control may be executed first.

Further, in a case where the linear solenoid valve is used as the pressure increasing valve, a linear pressure increasing control may be executed as the pressure increasing control. Further, the ABS control start condition may be the same for each control cycle, or the ABS control start condition may be different for each control cycle.

When the anti-skid control is started only for a first front wheel, the yaw moment control means executes a yaw moment control for a second front wheel, at which the anti-skid control is not executed, in order to restrain increase of the wheel cylinder pressure at the second front wheel. The first front wheel is one of the right and left front wheels, and the second front wheel is the other of the right and left front wheels.

The yaw moment control may be terminated when the ABS control for the second front wheel is started. In the yaw moment control, the pressure increasing control and the sustaining control for the second front wheel may be alternately repeated in predetermined cycles.

The anti-skid control means includes wheel cylinder pressure estimated value calculating means, pressure difference estimated value calculating means and pressure increasing valve control means.

The wheel cylinder pressure estimated value calculating means calculates an estimated value of a wheel cylinder pressure at a wheel being under the ABS control.

The wheel cylinder pressure estimated value varying during the ABS control can be sequentially calculated, for example, by use of a wheel cylinder pressure estimated initial value of a wheel cylinder pressure estimated value (hereinbelow referred to as a wheel cylinder pressure estimated initial value) obtained at a starting point of a first ABS control.

Specifically, in a case where a solenoid valve is used as the pressure reducing valve, a reducing amount of the wheel cylinder pressure caused by the operation of the pressure reducing valve is determined depending on the wheel cylinder pressure itself and a time period during which the pressure reducing valve is maintained in an opened state. Such characteristic on the pressure reduction by means of the pressure reducing valve can be obtained in advance by conducting a predetermined test and a simulation.

Thus, in a case where the solenoid valve is used as the pressure reducing valve, and a pressure reducing control for maintaining the pressure reducing valve in an opened state is executed, by setting the wheel cylinder pressure estimated value at the starting point of the pressure reducing control during the first ABS control so as to be equal to the wheel cylinder pressure estimated initial value, the wheel cylinder pressure estimated value, which varies (decreases) during the pressure reducing control, can be estimated on the basis of the characteristic of the pressure reduction by means of the pressure reducing valve.

Similarly, in a case where the solenoid valve is used as the pressure increasing valve, an increasing amount of the wheel cylinder pressure caused by the operation of the pressure increasing valve is determined depending on: a pressure difference between the master cylinder pressure and the wheel cylinder pressure; and a time period during which the pressure increasing valve is maintained in an opened state. Such characteristic on the pressure increase by means of the pressure increasing valve can be obtained in advance by conducting a predetermined test or a simulation.

Thus, in a case where the solenoid valve is used as the pressure increasing valve, and a control for alternately repeating opening and closing the pressure increasing valve as the pressure increasing control (hereinbelow referred to as an open/close pressure increasing control) is executed, by setting the wheel cylinder pressure estimated value at the starting point of the pressure increasing control during the first ABS control so as to be equal to the wheel cylinder pressure estimated value at the ending point of the pressure reducing control during the first ABS control, the wheel cylinder pressure estimated value, which varies (increases) during the pressure increasing control, can be estimated on the basis of: an open/close pattern of the pressure increasing valve during the open/close pressure increasing control; and the characteristic of the pressure increase by means of the pressure increasing valve.

On the other hand, in a case where a linear solenoid valve is used as the pressure increasing valve, and the linear pressure increasing control is executed as the pressure increasing control, by setting the wheel cylinder pressure estimated value at the starting point of the pressure increasing control during the first ABS control in the same manner as the case where the solenoid valve is used as the pressure increasing valve, the wheel cylinder pressure estimated value, which varies (increases) during the pressure increasing control can be estimated on the basis of a predetermined increase slope of the wheel cylinder pressure during the linear pressure increasing control.

Thus, by setting the wheel cylinder pressure estimated value (=wheel cylinder pressure estimated initial value) at the starting point of the first ABS control, the wheel cylinder pressure estimated value varying during the first ABS control can be sequentially calculated. Thus, by setting a wheel cylinder pressure estimated value at the starting point of the second ABS control so as to be equal to the wheel cylinder pressure estimated value at the ending point of the pressure increasing control in the first ABS control, a wheel cylinder pressure estimated value varying during the second ABS control can be sequentially calculated in the same manner as the first ABS control.

By repeating the above-mentioned steps, a wheel cylinder pressure estimated value on and after the third ABS control can also be sequentially calculated.

Thus, by use of the wheel cylinder pressure estimated initial value and a history of the variation of the wheel cylinder pressure estimated value, the wheel cylinder pressure estimated value calculating means calculates the wheel cylinder pressure estimated value varying during the ABS control, which is continuously repeated multiple times.

At this point, the wheel cylinder pressure estimated initial value may be a steady value, and it may be set in accordance with a vehicle running condition. Specifically, the wheel cylinder pressure estimated initial value may be calculated, for example, in consideration of a wheel cylinder pressure at which a wheel locking occurs on the basis of the vehicle deceleration (hereinbelow referred to as a locking pressure).

While the wheel cylinder pressure at the running vehicle is gradually increased, the wheel will be eventually locked when the wheel cylinder pressure reaches the locking pressure. The larger the friction coefficient of the road surface becomes (the larger the vehicle deceleration at a point where the locking occurs becomes), the larger locking pressure will be. Specifically, the locking pressure can be calculated on the basis of the vehicle deceleration (e.g., the vehicle deceleration at the starting point of the first ABS control).

On the other hand, the wheel cylinder pressure at the starting point of the first ABS control (in other words a wheel cylinder pressure estimated initial value of the wheel cylinder pressure) becomes approximately equal to the locking pressure. Thus, by setting the wheel cylinder pressure estimated initial value so as to be approximately equal to the locking pressure, not depending on a friction coefficient of the road surface, the wheel cylinder pressure estimated initial value can be calculated with high accuracy.

The pressure difference estimated value calculating means calculates, on the basis of at least the calculated wheel cylinder pressure estimated value, an estimated value (pressure difference estimated value) of the pressure difference between the master cylinder pressure and the wheel cylinder pressure at the wheel being under the ABS control. The pressure difference estimated value may be calculated on the basis of the wheel cylinder pressure estimated initial value and the wheel cylinder pressure estimated value.

Generally, the ABS control is started by executing a braking operation, the master cylinder pressure is increased in a short period after the starting point of the first ABS control and then sustained to an approximately constant level in most cases. Specifically, the master cylinder pressure during the ABS control is maintained to be in the vicinity of a value that is obtained by adding a specific increment in most cases immediately after the first ABS control to the above-mentioned wheel cylinder pressure estimated initial value.

Accordingly, the pressure difference (actual pressure difference) between the master cylinder pressure and the wheel cylinder pressure varies in the vicinity of the value that is obtained by adding the increment to the difference between the wheel cylinder pressure estimated initial value and the wheel cylinder pressure estimated value. Thus, by setting the pressure difference estimated value to the value obtained by adding the increment to the difference between the wheel cylinder pressure estimated initial value and the wheel cylinder pressure estimated value, the pressure difference estimated value (actual pressure difference) during the ABS control can be appropriately and accurately estimated and calculated.

Because an initial value of the difference between the wheel cylinder pressure estimated initial value and the wheel cylinder pressure estimated value is zero, the pressure difference estimated value during the ABS control may also be calculated by use of the increment and the variation history of the wheel cylinder pressure estimated value.

The increment has a characteristic of being increased as a time period from the start of the braking operation and the start of the first ABS control (hereinafter referred to as a braking operation time period before ABS control) is short. Thus, the increment may be determined in accordance with the braking operation time period before ABS control.

The pressure increasing control means executes the pressure increasing control on the basis of the pressure difference estimated value. Specifically, in a case where the linear solenoid valve is used as the pressure increasing valve, the conducting electric current value of the pressure increasing valve during the pressure increasing control is determined on the basis of the pressure difference estimated value. Specifically, for example, the conducting electric current value is determined by setting the command pressure difference so as to be equal to the pressure difference estimated value. Accordingly, on the basis of the pressure difference estimated value accurately estimated as mentioned above, the conducting electric current value at the starting point of the pressure increasing control can be set so as to come close to the actual pressure difference equivalent to a current value. As a result, when the linear pressure increasing control is executed, the wheel cylinder pressure can be smoothly increased from the starting point of the pressure increasing control.

On the other hand, in a case where the solenoid valve is used as the pressure increasing valve, the pressure increasing valve control means determines the open/close pattern of the pressure increasing valve during the pressure increasing control (open/close control) on the basis of the pressure difference estimated value. When the open/close pressure increasing control is executed, on the basis of the pressure difference estimated value accurately obtained as mentioned above, an increased amount of the wheel cylinder pressure while the pressure increasing valve is in an opened state is accurately calculated. Thus, by determining the open/close pattern of the pressure increasing valve as mentioned above, an average increase slope of the wheel cylinder pressure, which is repeatedly increased and sustained during the open/close pressure increasing control, easily agrees with an increase slope of the wheel cylinder pressure.

The brake fluid pressure control apparatus, having the above-mentioned configuration, related to the disclosed subject matter, is characterized in that the pressure difference estimated value calculating means includes a pressure difference at specific time calculating means. In a both front wheels are in an anti-skid control state (hereinafter, referred to as a both front wheels ABS control state), in which, once the ABS control start condition is established at the second front wheel at which the yaw moment control has been executed, the anti-skid control is started and executed for the second front wheel in addition to the first front wheel, the pressure difference at specific time calculating means calculates a pressure difference estimated value at specific time, which is estimated as a pressure difference estimated value of the second front wheel at a specific time, on the basis of: the pressure difference estimated value for the first front wheel calculated by the pressure difference estimated value calculating means; and the wheel cylinder pressure difference between the wheel cylinder pressure estimated value for the second front wheel and the wheel cylinder pressure estimated value for the first front wheel, which are calculated by the wheel cylinder pressure estimated value calculating means. At this point, when the braking operation is executed while the vehicle is running on the split road, the first front wheel corresponds to the low μ side front wheel, and the second front wheel corresponds to the high μ side front wheel.

For example, in a case where the brake fluid pressure control for the second front wheel is shifted from the yaw moment control to the ABS control when the braking operation is made at the vehicle is running on the split road (namely the wheels is in the both front wheels ABS control state), the actual pressure difference at the second front wheel can be calculated by subtracting a difference between the wheel cylinder pressure at the second front wheel and the wheel cylinder pressure at the first front wheel from the actual pressure difference at the first front wheel.

Thus, in the both front wheels ABS control state, the pressure difference estimated value at the second front wheel can be calculated by subtracting a difference (a wheel cylinder pressure difference) between the wheel cylinder pressure estimated value at the second front wheel and the wheel cylinder pressure estimated value at the first front wheel, which are obtained by the wheel cylinder pressure estimated value calculating means, from the pressure difference estimated value at the first front wheel calculated by the pressure difference estimated value calculating means (e.g., calculated on the basis of the above-mentioned increment and a variation history of the wheel cylinder pressure estimated value).

Until a transitional point at which the brake fluid pressure control for the second front wheel is changed from the yaw moment control to the ABS control (at a point where the both front wheels ABS control state is started), the ABS control for the first front wheel has been executed and continued for a certain time period. Specifically, when the both front wheels ABS control state is started, at least the calculation of the wheel cylinder pressure estimated value for the first front wheel and the calculation of the pressure difference estimated value for the first front wheel have been executed and continued for a certain time period.

Those calculations for estimation are generally characterized in that estimation accuracy is getting higher as a time period, in which the calculation is executed, is increased, this will be detailed later.

Thus, when the both front wheels ABS control state is started, it may be considered that at least estimation accuracy of the wheel cylinder pressure estimated value for the first front wheel and estimation accuracy of the pressure difference estimated value for the first front wheel are getting higher.

Thus, in the both front wheels ABS control state, the pressure difference estimated value at specific time calculated by the pressure difference at specific time calculating means (in other words a pressure difference estimated value at a specific time for the second front wheel) can be accurately calculated by subtracting a difference between the wheel cylinder pressure estimated value for the second front wheel at the specific time and an accurate wheel cylinder pressure difference estimated value at the first front wheel from an accurate pressure difference estimated value at the first front wheel at the specific time.

The pressure difference estimated value for the second front wheel at the specific time can be calculated by use of the above-mentioned increment and the variation history of the wheel cylinder pressure estimated value, however, the pressure difference estimated value at specific time can be calculated to be more accurate than these values.

Further, the pressure difference estimated value for the second front wheel after the specific time can be continuously and accurately calculated on the basis of, for example, the pressure difference estimated value at specific time and the variation history of the wheel cylinder pressure estimated value for the second front wheel after the specific time.

Thus, the pressure difference estimated value calculating means including the pressure difference at specific time calculating means can continuously and accurately calculate the pressure difference estimated value (an actual pressure difference) after the specific time during the ABS control for the second front wheel, when the brake fluid pressure control for the second front wheel is changed from the yaw moment control to the ABS control.

At this point, the specific time may be set at one point (minute), two points or more (namely a predetermined time period). The specific time may be two points or more corresponding to a specific time period (a part of the time period or an entire time period) from the starting point of the pressure reducing control in the first ABS control for the second front wheel to the ending point of the ABS control for the second front wheel.

When the specific time is set to one point, the specific time may be set to, for example, the starting point of the pressure reducing control in the first ABS control for the second front wheel or the starting point of the pressure increasing control in the first ABS control for the second front wheel. In this case, it is better to use the starting point of the pressure increasing control than the starting point of the pressure reducing control in the first ABS control for the second front wheel.

This is because the starting point of the pressure increasing control comes after the starting point of the pressure reducing control, the pressure difference estimated value for the first front wheel, the wheel cylinder pressure estimated value for the second front wheel and the wheel cylinder pressure estimated value for the first front wheel, which are used for the calculation of the pressure difference estimated value at specific time, are set with high accuracy.

Accordingly, the pressure difference at specific time calculating means may calculate the pressure difference estimated value for the second front wheel at the starting point of the pressure increasing control in the first anti-skid control for the second front wheel as the pressure difference estimated value at specific time.

When the linear solenoid valve is used as the pressure increasing valve, according to the brake fluid pressure control apparatus related to the disclosed subject matter, the pressure difference at specific time calculating means may calculate the pressure difference estimated value at specific time on the basis of the pressure difference estimated value for the first front wheel and a value corresponding to the wheel cylinder pressure difference being smaller than the wheel cylinder pressure difference.

As mentioned in the background, when the linear solenoid valve is used as the pressure increasing valve, when the command pressure difference (the pressure difference estimated value) is larger than the actual pressure difference, the increase start delay at wheel cylinder pressure may occur. Further, when the command pressure difference (the pressure difference estimated value) is smaller than the actual pressure difference, a delay of rapid increase of wheel cylinder pressure may occur. In light of maintaining vehicle stability, because it is highly demanded to prevent the rapid increase of wheel cylinder pressure occurrence, the pressure difference estimated value, which is potentially including an error, may be set to be slightly larger.

According to the above configuration, when the pressure difference estimated value at specific time is calculated, because a value being smaller than the wheel cylinder pressure difference is used instead of the wheel cylinder pressure difference itself, the pressure difference estimated value at specific time (in addition, the pressure difference estimated value for the second front wheel after the specific time) is calculated so as to be slightly larger. Thus, the rapid increase of wheel cylinder pressure occurrence can be efficiently reduced.

Further, on the basis of the same reason, the pressure difference at specific time calculating means may set the pressure difference estimated value at specific time by adding a predetermined addition value thereto. Thus, the occurrence of the rapid increase of wheel cylinder pressure can be reduced.

Thus, when the pressure difference estimated value at specific time is set by adding the predetermined addition value, the pressure difference estimated value calculating means, during the pressure increasing control for the second front wheel after the specific time in the both front wheels anti-skid control state, may execute the pressure difference reducing process for setting the pressure difference estimated value for the second front wheel by subtracting a predetermined subtraction value therefrom each time a predetermined time period passes.

By executing the pressure difference reducing process, when the pressure difference estimated value at specific time is set to be slightly larger than the actual pressure difference, a timing when the pressure difference estimated value for the second front wheel after the specific time agrees with the actual pressure difference (or becomes smaller than the actual pressure difference) can be advanced. As a result, the level of the increase start delay at wheel cylinder pressure can be reduced.

Thus, when the pressure difference reducing process is executed, the pressure difference estimated value calculating means may terminate the pressure difference reducing process when the degree of the slip occurred at the second front wheel worsens, and a first condition related to the increase of the deceleration of the vehicle is detected.

A detection of the first condition in the pressure increasing control for the second front wheel means that the wheel cylinder pressure for the second front wheel is increasing, in other words, it means that the pressure difference estimated value for the second front wheel, which had been larger than the actual pressure difference, has agreed with the actual pressure difference (or becomes less than the actual pressure difference). Specifically, after the first condition is detected, there is no need to execute the pressure difference reducing process.

Further, as mentioned above, when the pressure difference estimated value at specific time is set by adding the predetermined addition value, if a second condition related to an increase of the slipping degree at the second front wheel before a predetermined time passes from the specific time, during the pressure increasing control for the second front wheel after the specific time in the both front wheels anti-skid control state, the pressure difference estimated value calculating means may execute the pressure difference increasing process for setting the pressure difference estimated value for the second front wheel so as to be lager by a the predetermined increasing value The second condition detected before the predetermined time passes (a predetermined short time period passes) from the specific time during the pressure increasing control for the second front wheel after the specific time means that the "rapid increase of wheel cylinder pressure" occurs because of the pressure difference estimated value at specific time being smaller than the actual pressure difference, regardless of the pressure difference estimated value at specific time being set by adding the predetermined additional value. Specifically, when the second condition is detected, in order to decrease the level of the "rapid increase of wheel cylinder pressure, the pressure difference estimated value at the second front wheel should be immediately corrected to be larger.

In this case, the pressure difference estimated value calculating means may calculate an increasing value on the basis of a vehicle wheel deceleration at the second front wheel (e.g., a vehicle wheel deceleration at a point where the second condition is detected).

Further, the vehicle wheel deceleration at the second front wheel when the second condition is detected can indicate a level of the "rapid increase of wheel cylinder pressure", in other words, the level of a shortage of the pressure difference estimated value at the second front wheel relative to the actual pressure difference. Thus, in this configuration, the increasing value can be set to an appropriate value that corresponds to the level of the shortage of the pressure difference estimated value at the second front wheel relative to the actual pressure difference.

An embodiment of a brake hydraulic pressure control apparatus for the vehicle related to the disclosed subject matter will be explained in accordance with the attached drawings. FIG. 1 illustrates a schematic configuration of the vehicle to which a brake apparatus 10 for the vehicle including the brake fluid pressure control apparatus related to the embodiment of the disclosed subject matter is mounted. The vehicle has four wheels including two front wheels (a right-front wheel FR and a left-front wheel FL) serving as driven wheels and two rear wheels (a right-rear wheel RR and a left-rear wheel RL) serving as driving wheels.

Figure 2:
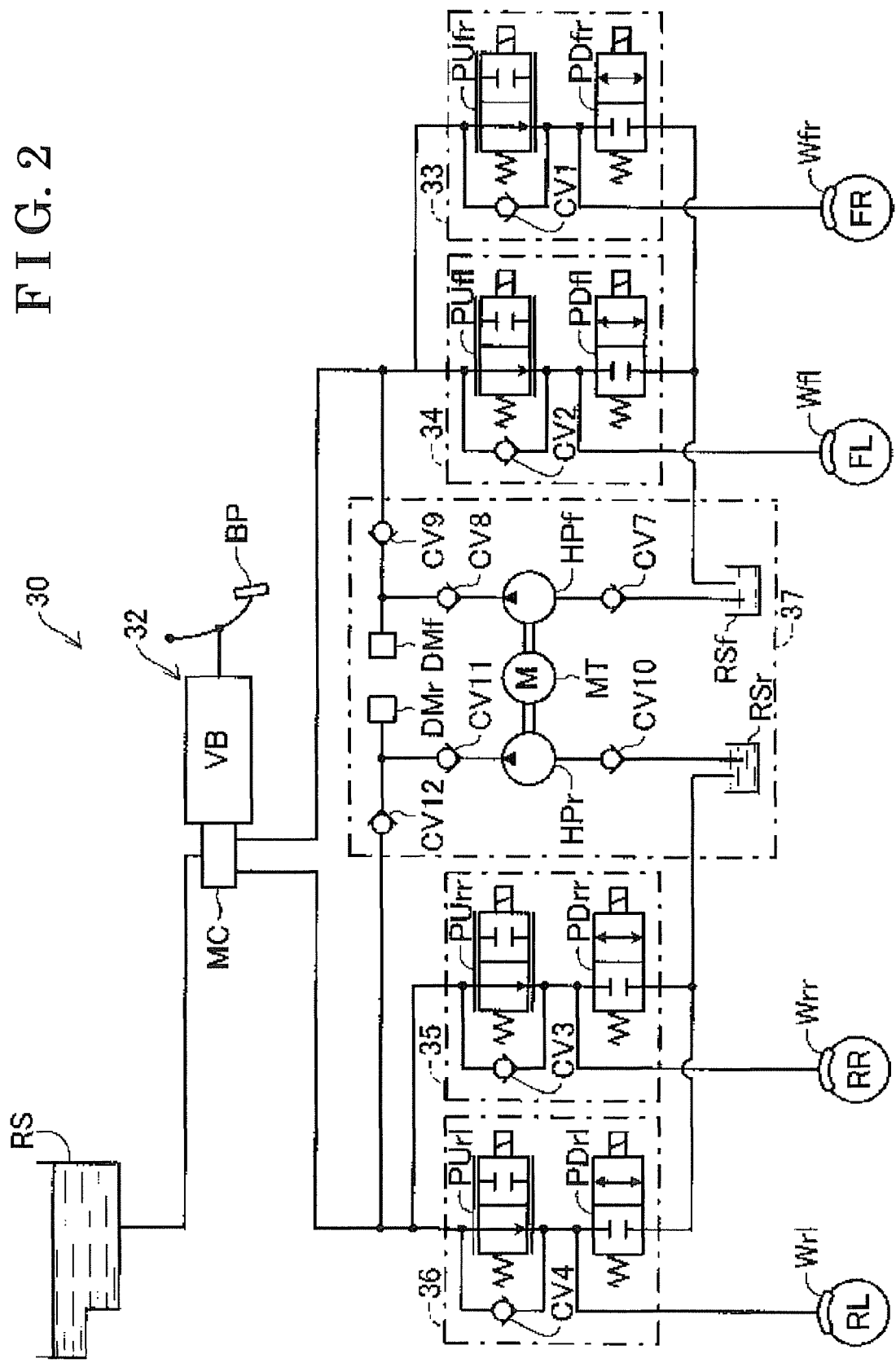
FIG. 2 illustrates a schematic diagram of the brake hydraulic pressure control unit indicated in FIG. 1.

The brake apparatus 10 includes a brake hydraulic pressure control unit 30 for generating a braking force by brake fluid pressure at each wheel. Specifically, as illustrated in FIG. 2 indicating a schematic configuration, the brake hydraulic pressure control unit 30 includes a brake fluid pressure generating portion 32, a FR brake fluid pressure adjusting portion 33, a FL brake fluid pressure adjusting portion 34, a RR brake fluid pressure adjusting portion 35, a RL brake fluid pressure adjusting portion 36 and a brake fluid circulating portion 37. Specifically, the brake fluid pressure generating portion 32 generates brake fluid pressure in accordance with an operation force at a brake pedal BP, the FR brake fluid pressure adjusting portion 33 is for adjusting the brake fluid pressure provided to a wheel cylinder Wfr located at a wheel FR, the FL brake fluid pressure adjusting portion 34 is for adjusting the brake fluid pressure provided to a wheel cylinder Wfl located at a wheel FL, the RR brake fluid pressure adjusting portion 35 is for adjusting the brake fluid pressure provided to a wheel cylinder Wrr located at a wheel RR, and the RL brake fluid pressure adjusting portion 36 is for adjusting the brake fluid pressure provided to a wheel cylinder Wrl located at a wheel RL.

The brake fluid pressure generating portion 32 is comprised of a vacuum booster VB actuated in accordance with the operation of the brake pedal BP and a master cylinder MC connected to the vacuum booster VB. The vacuum booster VB assists the operation force of the brake pedal BP at a predetermined rate by use of air pressure (negative pressure)

within a suction pipe provided at an engine (not shown), and such assisted operation force is transmitted to the master cylinder MC.

The master cylinder MC includes two output ports, a first port and a second port, and when the brake fluid is supplied from reservoir RS to the master cylinder MC, the master cylinder MC generates first master cylinder hydraulic pressure corresponding to the assisted operation force and outputs from the first port, at the same time, the master cylinder MC also generates a second master cylinder pressure corresponding to the assisted operation force and outputs from the second master cylinder pressure, a second master cylinder pressure being approximately equal to the first master cylinder pressure. Because configurations and operations of the master cylinder MC and the vacuum booster VB are already known, explanation of the configurations and the operations will be omitted. As mentioned above, the master cylinder MC and the vacuum booster VB (brake fluid pressure generating means) generate the first master cylinder pressure and the second master cylinder pressure in accordance with the operation force of the brake pedal BP.

The first port of the master cylinder MC is connected to the FR brake fluid pressure adjusting portion 33 at an upper portion thereof and the FL brake fluid pressure adjusting portion 34 at an upper portion thereof. The second port of the master cylinder MC is connected to the RR brake fluid pressure adjusting portion 35 at an upper portion thereof and the RR brake fluid pressure adjusting portion 35 at an upper portion thereof. In this configuration, the first master cylinder pressure is supplied to each of the upper portion of the FR brake fluid pressure adjusting portion 33 and the upper portion of the FL brake fluid pressure adjusting portion 34 respectively, at the same time, the second master cylinder pressure is supplied to each of the upper portion of the RR brake fluid pressure adjusting portion 35 and the upper portion of the RL brake fluid pressure adjusting portion 36 respectively.

The FR brake fluid pressure adjusting portion 33 includes a pressure increasing valve PUfr and a pressure reducing valve PDfr. Specifically, the pressure increasing valve PUfr is a normally opened linear solenoid valve, and the pressure reducing valve PDfr is a two port and two-position switchover normally closed solenoid valve. The pressure reducing valve PDfr disconnects between the wheel cylinder Wfr and a reservoir RSf when the valve is in a closed state (a state corresponding to nonexcitation (OFF)) as illustrated in FIG. 2, on the other hand, the pressure reducing valve PDfr connects between the wheel cylinder Wfr and the reservoir RSf when the valve is in an opened state (a state corresponding to excitation (ON)).

A force on the basis of a biasing force of a coil spring (not shown) is normally applied to a valve element of the pressure increasing valve PUfr in an opened direction. Further, a force in the opened direction on the basis of a pressure difference (actual pressure difference) between the master cylinder pressure and the wheel cylinder pressure and a force in a closed direction on the basis of a suction force increasing in proportion to the conducting electric current value (a command current value Id) are also applied to the valve element of the pressure increasing valve PUfr.

Figure 3:
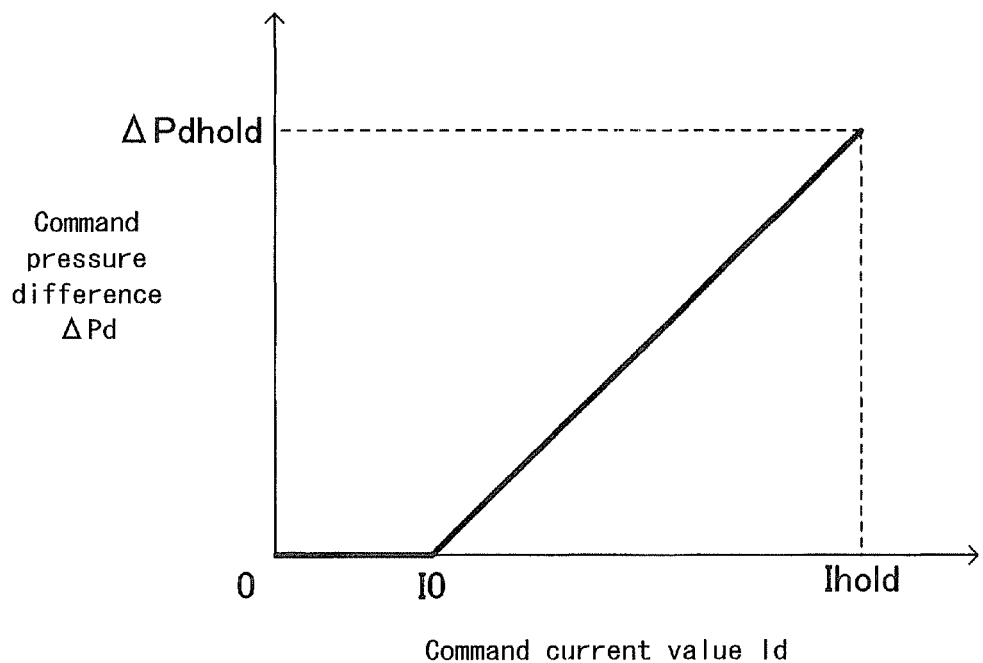
FIG. 3 illustrates a graph indicating a relation between a command current and a command pressure difference at a pressure increasing valve illustrated in FIG. 2.

As a result, as illustrated in FIG. 3, the pressure difference (a command pressure difference ΔPd) corresponding to the suction force is determined so as to increase in proportion to a command current value Id. I0 in FIG. 3 indicates an electric current corresponding to the biasing force of the coil spring. The pressure increasing valve PUfr is operated so as to be closed, when it is determined that the command pressure difference ΔPd is larger than the actual pressure difference (in other words, when the command current value Id is larger than the actual pressure difference equivalent to a current value), in order to disconnect between the upper portion of the FR brake fluid pressure adjusting portion 33 and the wheel cylinder Wfr so that the brake fluid does not flow from the upper portion of the FR brake fluid pressure adjusting portion 33 to the wheel cylinder Wfr. On the other hand, the pressure increasing valve PUfr is operated so as to be opened, when it is determined that the command pressure difference ΔPd is smaller than the actual pressure difference (in other words, when the command current value Id is smaller than the actual pressure difference equivalent to a current value), in order to connect between the upper portion of the FR brake fluid pressure adjusting portion 33 and the wheel cylinder Wfr so that the brake fluid flows from the upper portion of the FR brake fluid pressure adjusting portion 33 to the wheel cylinder Wfr. Thus, the actual pressure difference is reduced so as to be balanced with the command pressure difference ΔPd.

In this way, the actual pressure difference (an allowable maximum value of the actual pressure difference) is controlled in accordance with the command current value Id for the pressure increasing valve PUfr. Further, when the pressure increasing valve PUfr is operated so as to be in a nonexcitation state (in other words, a command current value Id is set to "0"), the pressure increasing valve PUfr is maintained to be in an opened state by means of the biasing force of the coil spring. Further, the pressure increasing valve PUfr is maintained to be in a closed state by setting the command current value Id to be a value corresponding to the command pressure difference ΔPdhold (e.g., a closed valve maintaining current value Ihold), which is significantly larger than a maximum value of the pressure difference generated as the actual pressure difference.

By gradually reducing the command current value Id for the pressure increasing valve PUfr from an actual pressure difference equivalent to a current value at a present moment while the pressure reducing valve PDfr is in a closed state, the actual pressure difference is gradually reduced, as a result, the brake fluid pressure (wheel cylinder pressure) within the wheel cylinder Wfr is smoothly increased. This control for linearly increasing the wheel cylinder pressure is referred to as a linear pressure increasing control.

Further, by maintaining the pressure increasing valve PUfr to be in a closed state and maintaining the pressure reducing valve PDfr to be in a closed state, the wheel cylinder pressure is sustained to the hydraulic pressure at the present moment, regardless of the level of the hydraulic pressure at the upper portion of the FR brake fluid pressure adjusting portion 33. This control for sustaining the wheel cylinder pressure is referred to as a sustaining control.

Further, when the pressure increasing valve PUfr is maintained to be in a closed state, and the pressure reducing valve PDfr is maintained to be in an opened state, the brake fluid within the wheel cylinder Wfr is refluxed to the reservoir RSf, as a result, the wheel cylinder pressure is reduced. The control for reducing the wheel cylinder pressure is referred to as a pressure reducing control. Thus, the linear pressure increasing control, the sustaining control, and the pressure reducing control are executed for the brake fluid pressure (wheel cylinder pressure) within the wheel cylinder Wfr.

Further, a check valve CV1 is provided at the pressure increasing valve PUfr so as to be parallel thereto in order to allow the brake fluid to flow in one direction from the wheel cylinder Wfr to the upper portion of the FR brake fluid pressure adjusting portion 33. In this configuration, when the brake pedal BP, which has been operated, is released, the brake fluid pressure within the wheel cylinder Wfr is rapidly reduced through the check valve CV1.

The FL brake fluid pressure adjusting portion 34, the RR brake fluid pressure adjusting portion 35 and the RL brake fluid pressure adjusting portion 36 are configured in the same manner as the FR brake fluid pressure adjusting portion 33. Specifically, the FL brake fluid pressure adjusting portion 34 includes a pressure increasing valve PUfl and a pressure reducing valve PDfl, the RR brake fluid pressure adjusting portion 35 includes a pressure increasing valve PUrr and a pressure reducing valve PDrr, and the RL brake fluid pressure adjusting portion 36 includes a pressure increasing valve PUrl and a pressure reducing valve PDrl. In this configuration, the linear pressure increasing control, the sustaining control and the pressure reducing control are executed for each of the wheel cylinder Wfl, the wheel cylinder Wrr and the wheel cylinder Wrl. Further, a check valve CV2 is provided at the pressure increasing valve PUfl, a check valve CV3 is provided at the pressure increasing valve PUrr and the check valve CV4 is provided at the pressure increasing valve PUrl, and each check valve achieves the function in the same manner as the check valve CV1.

The brake fluid circulating portion 37 includes a DC motor MT and two hydraulic pumps HPf and HPr, which are simultaneously driven by the DC motor MT. The hydraulic pump HPf suctions the brake fluid in the reservoir RSf that is refluxed from the pressure reducing valves PDfr and PDfl via a check valve CV7, and the suctioned brake fluid is provided to the upper portions of the FR brake fluid pressure adjusting portion 33 and the FL brake fluid pressure adjusting portion 34 via check valves CV8 and CV9.

In the same manner as the hydraulic pump HPf, the hydraulic pump HPr suctions the brake fluid in the reservoir RSr refluxed from the pressure reducing valves PDrr and PDrl via a check valve CV10, and the suctioned brake fluid is provided to the upper portions of the RR brake fluid pressure adjusting portion 35 and the RL brake fluid pressure adjusting portion 36 via check valves CV11 and CV12. Further, a damper DMf is provided at the hydraulic pressure circuit between the check valves CV8 and CV9, and another damper DMr is provided at the hydraulic pressure circuit between the check valves CV11 and CV12. Because of the dampers DMf and DMr, pulse at the discharged pressure from the hydraulic pumps HPf and HPr is reduced.

The motor MT (the hydraulic pumps HPf and HPr) is driven at a predetermined speed essentially when at least one of the pressure reducing valves PDfr, PDfl, PDrr and PDrl is in an opened state (when the pressure reducing control is executed at one or more of the wheels).

In the abovementioned configuration, when all the solenoid valves are in the nonexcitation state, the brake hydraulic pressure control unit 30 supplies the brake fluid pressure (master cylinder pressure) corresponding to the operation force of the brake pedal BP to each wheel cylinder. Further, in this state, the brake fluid pressure in a selected wheel cylinder can be controlled so as to be lower than the master cylinder pressure by a predetermined pressure amount by controlling a selected pressure increasing valve PU and a selected pressure reducing valve PD. Specifically, the brake hydraulic pressure control unit 30 can control a selected wheel cylinder pressure at a selected wheel so as to be lower than the master cylinder pressure.

As illustrated in FIG. 1, the brake apparatus 10 further includes wheel speed sensors 41fl, 41fr, 41rl and 41rr at each wheel in order to output a signal having a pulse on each rotation of the wheel for a predetermined angle. The brake apparatus 10 further includes a brake switch 42 and an ECU 50 (electric control unit). Specifically, the brake switch 42 selectively outputs an ON signal (High signal) or an OFF signal (Low signal) depending on whether or not the brake pedal BP is operated.

The ECU 50 is a microcomputer having a CPU 51, a ROM 52 in which routines (program) executed by the CPU 51, a table (a lookup table or a map), a constant number and the like are memorized in advance, a RAM 53 in which data is temporally stored by the CPU 51 if necessary, a backup RAM 54 storing data while the power is supplied and retaining the data even when the power is not supplied and an interface 55 having an AD converter. These elements are connected by means of a bus.

The interface 55 is connected to the wheel speed sensor 41 and the brake switch 42, and signals are supplied from the wheel speed sensor 41 and the brake switch 42 to the CPU 51 via the interface 55, at the same time, in accordance with the instruction of the CPU 51, a drive signal is outputted to the solenoid valve (the pressure increasing valve PU and the pressure reducing valve PD) of the brake hydraulic pressure control unit 30 and the motor MT.

Each abbreviation "" added to the end of each parameter explains a comprehensive notation of "fl" indicating the front left wheel, "fr" indicating the front right wheel, "rl" indicating the rear left wheel or "rr" indicating the rear right wheel. For example, the pressure increasing valve PU comprehensively indicates the front left wheel pressure increasing valve PUfl, the front right wheel pressure increasing valve PUfr, the rear left wheel pressure increasing valve PUrl and the right rear wheel pressure increasing valve PUrr.

Figure 4:
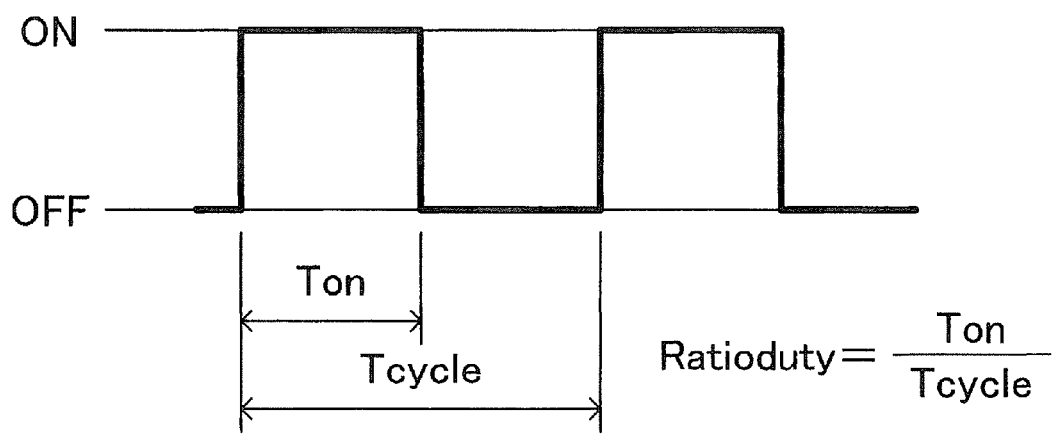
FIG. 4 illustrates a diagram indicating a conducting pattern while the command current indicated in FIG. 3 is duty controlled.

The command current value Id (conducting electric current value) of the pressure increasing valve PU is controlled by the CPU 51. Specifically, as illustrated in FIG. 4, the CPU 51 adjusts an average (effective) current (=command current value Id) by adjusting a percentage of the conducting time Ton to the pressure increasing valve PU relative to one cycle time Tcycle (duty ratio Ratioduty=(Ton/Tcycle)). As a result, the command current value Id for each wheel is linearly and variably controlled by respectively adjusting the duty ratio Ratioduty for each wheel (duty control).

As mentioned above, the brake hydraulic pressure control unit 30 (CPU 51) executes an anti-skid control (ABS control), which will be explained later in detail, in order to prevent the vehicle wheel from slipping excessively when the driver operates the brake pedal BP. In this regard, the brake hydraulic pressure control unit 30 (CPU 51) constitutes an anti-skid control means for executing anti-skid control.

(Description of ABS Control)

Next, an ABS control executed by the brake apparatus 10 including the brake fluid pressure control apparatus related to the embodiment of the disclosed subject matter will be explained. The brake apparatus 10 starts the ABS control in response to the establishment of a predetermined ABS control start condition. In the ABS control, the pressure reducing control is started and executed at the same time when the ABS control start condition is established, and the linear pressure increasing control is executed after the pressure reducing control when the predetermined pressure increasing control start condition is established during the pressure reducing control.

During the liner pressure increasing control in the current ABS control, when the ABS control start condition is established again, the executing linear pressure increasing control is terminated, at the same time, a next ABS control is continuously started. Specifically, assuming that a time period from the point in time where the ABS control start condition is established to the other point in time where the next ABS control start condition is established is one control cycle, the brake apparatus 10 continuously repeats ABS control, which is a combination of the pressure reducing control and the linear pressure increasing control, multiple times for plural control cycles, after the point in time where the ABS control start condition is established until the time at which a predetermined ABS control termination condition is established. The ABS control executed by the brake apparatus 10 will be explained more specifically in accordance with FIG. 5.

Figure 5:
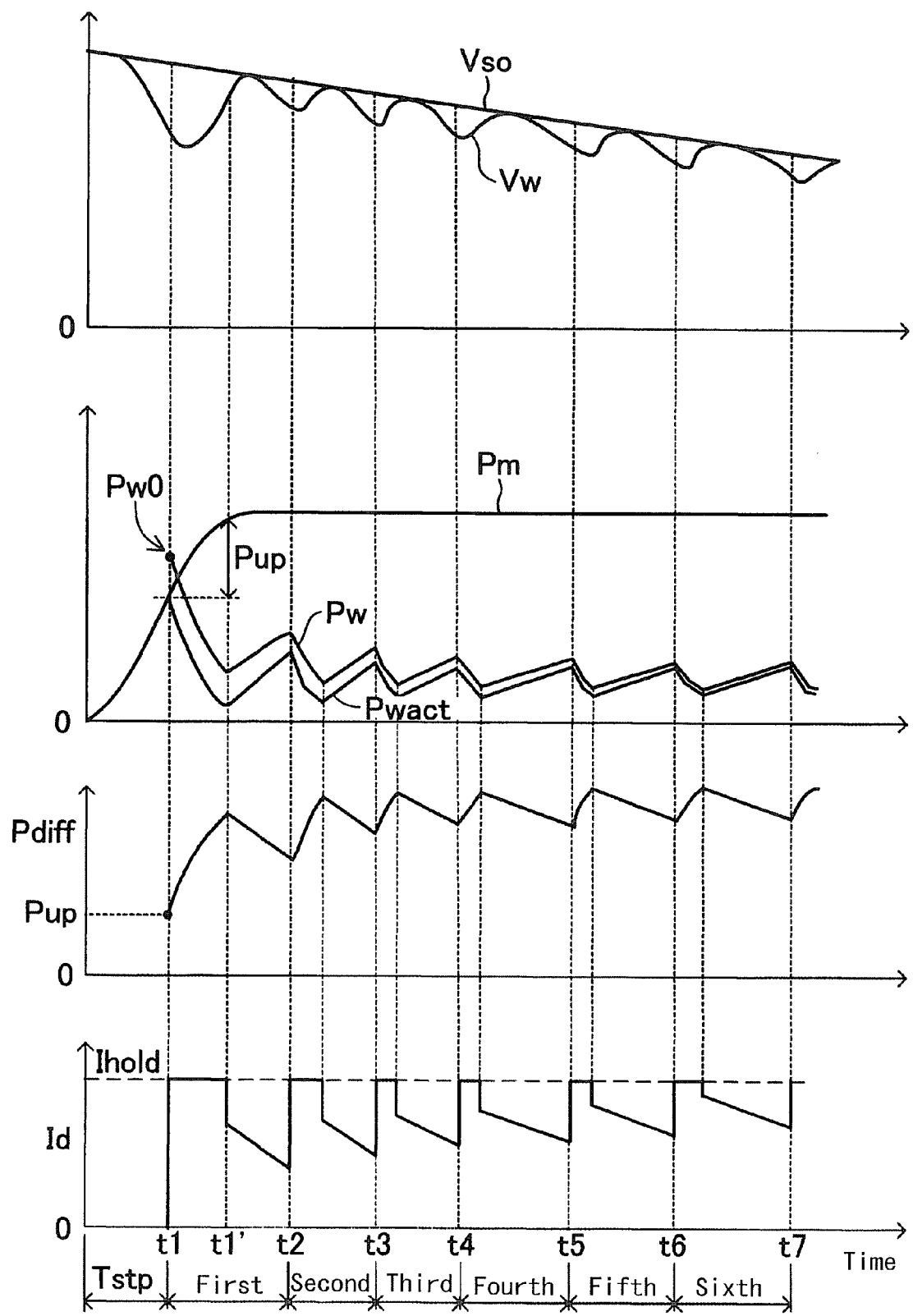
FIG. 5 illustrates a time chart indicating examples of variations of physical values when an ABS control is started and executed by the brake apparatus illustrated in FIG. 1.

FIG. 5 illustrates a time chart indicating examples of variations of a vehicle speed Vso, a wheel speed Vw, a master cylinder pressure Pm, an actual wheel cylinder pressure (actual wheel cylinder pressure Pwact), a wheel cylinder pressure estimated value Pw, mentioned in detail thereafter, a pressure difference estimated value Pdiff, also mentioned in detail thereafter, and a command current value Id of the pressure increasing valve PU serving as the linear solenoid valve, when the ABS control is started and executed for a selected wheel by the brake apparatus 10 from a time t1 when the driver operates the brake pedal BP.

In this case, as illustrated in FIG. 5, before the time t1, because the ABS control is not executed, the actual wheel cylinder pressure Pwact becomes approximately equal to the master cylinder pressure Pm. When the time reaches the time t1, the ABS control start condition is established, and the brake apparatus 10 starts the pressure reducing control (pressure increasing valve PU: closed (command current value Id: Ihold), pressure reducing valve PD: opened). As a result, the first control cycle (first ABS control) is started, at the same time, the actual wheel cylinder pressure Pwact starts reducing. In this example, the ABS control start condition includes formulas SLIP>SLIP1 and DVw<−DVw1.

The SLIP is a slip amount at the wheel , and the slip amount SLIP is indicated by a following formula (1). In the formula (1), Vso indicates the vehicle speed, in this example, Vso is a maximum value of the wheel speed Vw. The DVw indicates a wheel acceleration of the wheel  (a time derivative of the wheel speed Vw**). Each of the SLIP1 and the DVw1 is a predetermined constant number.

$$SLIP^{}=Vso-Vw^{} \quad (1)$$

Then, at the time t1', a pressure increasing control start condition is established, and the brake apparatus 10 starts the linear pressure increasing control following the pressure reducing control. In this example, the pressure increasing control start condition includes formula "SLIP**<SLIP2". In this formula, the SLIP2(<SLIP1) indicates a predetermined constant number.

In the linear pressure increasing control, the pressure reducing valve PD is maintained to be in a closed state. Further, in the linear pressure increasing control, a pressure difference estimated value Pdiff, which is sequentially estimated and updated so as to agree with the actual pressure difference from the starting point of the first ABS control as described later, is used as a command pressure difference ΔPd, in order to sequentially determine and change the command current value Id of the pressure increasing valve PU on the basis of a table illustrated in FIG. 3 and the pressure difference estimated value Pdiff.

Accordingly, as illustrated in FIG. 5, the command current value Id is linearly reduced in accordance with the pressure difference estimated value Pdiff, which is linearly reduced during the linear pressure increasing control, as a result, the actual wheel cylinder pressure Pwact is increased.

According to the brake apparatus 10, the linear pressure increasing control continues until the ABS control start condition is established again (in other words, until the second ABS control is started). Then, at time t2, because the ABS control start condition is established again, the brake apparatus 10 stops the executing linear pressure increasing control and terminates the first ABS control, at the same time, the brake apparatus 10 starts and executes the second ABS control including the pressure reducing control and the linear pressure increasing control as a pair, in the same manner as the first ABS control.

Thereafter, the brake apparatus 10 starts and executes a next ABS control, which includes the pressure reducing control and the linear pressure increasing control as a pair, each time the ABS control start condition is established (times t3, t4, t5, t6, t7 in FIG. 5), unless the ABS control termination condition is established, in the same manner as the first ABS control. In this way, the ABS controls are sequentially executed.

(Pressure Difference Estimated Value Pdiff)

Hereinafter, the pressure difference estimated value Pdiff used for determining the command current value Id of the pressure increasing valve PU during the linear pressure increasing control as mentioned above will be explained in detail. The pressure difference estimated value Pdiff is an estimated value of a pressure difference (=an actual pressure difference) between the master cylinder pressure Pm and the wheel cylinder pressure. In this example, the pressure difference estimated value Pdiff is calculated and updated during a time period from the starting point of the first ABS control (the time t1 in FIG. 5) to the time at which the ABS control termination condition is established, by use of the following formula (2).

$$Pdiff=(Pw0-Pw)+Pup \quad (2)$$

In the formula (2), Pw0 indicates a wheel cylinder pressure estimated initial value that is an estimated value of the wheel cylinder pressure at the starting point of the first ABS control. The Pw indicates an estimated value of the wheel cylinder pressure varying during the ABS control. An initial value of the Pw is Pw0. The Pup in the formula (2) indicates an increment of the master cylinder pressure Pm after the starting point of the first ABS control as illustrated in FIG. 5 (hereinafter, referred to as an additional pressure value).

As illustrated in FIG. 5, it is generally considered that the master cylinder pressure Pm during the ABS control is maintained to be in the vicinity of a value obtained by adding the additional pressure value Pup to the wheel cylinder pressure at the starting point of the first ABS control. Thus, it is considered that the pressure difference (actual pressure difference) between the master cylinder pressure Pm and the wheel cylinder pressure varies keeping a value that is approximately equal to a value obtained by adding the additional pressure value Pup to a difference between the wheel cylinder pressure estimated initial value Pw0 and the wheel cylinder pressure estimated value Pw (Pw0−Pw). The formula (2) is set on the basis of these considerations. Further, a setting method for the additional pressure value Pup will be explained in detail.

<Additional Pressure Value Pup>

Figure 6:
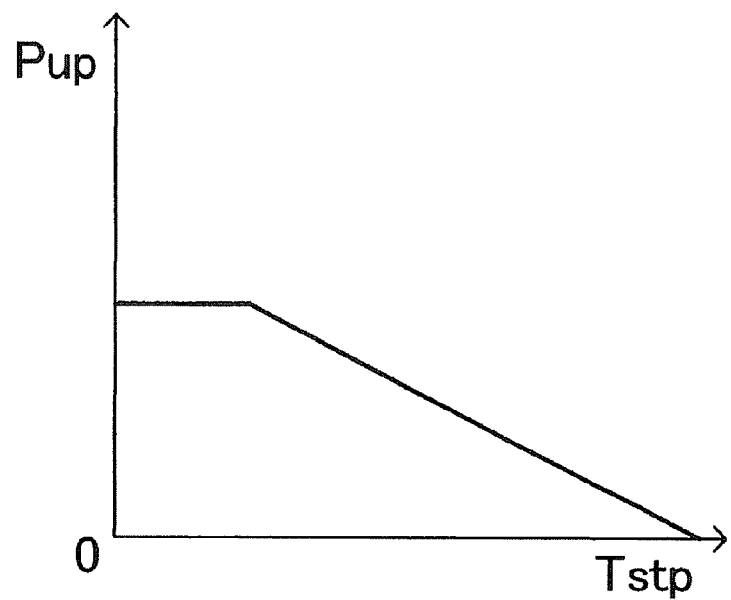
FIG. 6 illustrates a graph indicating a relation between an additional pressure value and a braking operation time period before ABS control.

The additional pressure value Pup is characterized in that, the shorter a time period from the starting point of the operation of the brake pedal BP (brake switch 42:ON) to the starting point of the first ABS control (braking operation time period before ABS control Tstp, see FIG. 5) is, the larger the additional pressure value Pup will be. Thus, the brake apparatus 10 calculates the additional pressure value Pup on the basis of: a table illustrated in FIG. 6 defining a relation between the braking operation time period before ABS control Tstp and the additional pressure value Pup; and the braking operation time period before ABS control Tstp.

<Wheel Cylinder Pressure Estimated Initial Value Pw0>

A setting method for the wheel cylinder pressure estimated initial value Pw0 in the formula (2) will be explained. While the vehicle is driven, as the wheel cylinder pressure is gradually increased, the wheel is locked once the wheel cylinder pressure reaches a certain level. Hereinafter, this level of pressure will be referred to as a locking pressure Plock. The locking pressure Plock varies approximately in proportion to the friction coefficient of the road surface µ.

On the other hand, the vehicle deceleration Dvso at a point where the wheel lock occurs varies approximately in proportion to the friction coefficient of the road surface µ. The vehicle deceleration Dvso can be obtained by changing a time derivative from negative to positive, or by changing a time derivative from positive to negative. Thus, the locking pressure Plock varies approximately in proportion to the vehicle deceleration Dvso at the point where the wheel lock occurs. Further, the wheel cylinder pressure estimated initial value Pw0 is characterized in that it approximately agrees with the locking pressure Plock.

Thus, the brake apparatus 10 determines the locking pressure Plock on the basis of the vehicle deceleration Dvso at the starting point of the first ABS control and the predetermined table, and the wheel cylinder pressure estimated initial value Pw0 is set so as to be equal to the locking pressure Plock.

<Wheel Cylinder Pressure Estimated Value Pw>

Next, a calculation method of the wheel cylinder pressure estimated value Pw in the formula (2) will be explained. As mentioned above, once the first ABS control is started, the calculation of the wheel cylinder pressure estimated value Pw is started (see FIG. 5), and at the starting point of the first ABS control, the wheel cylinder pressure estimated value Pw is set to the wheel cylinder pressure estimated initial value Pw0.

Figure 7:
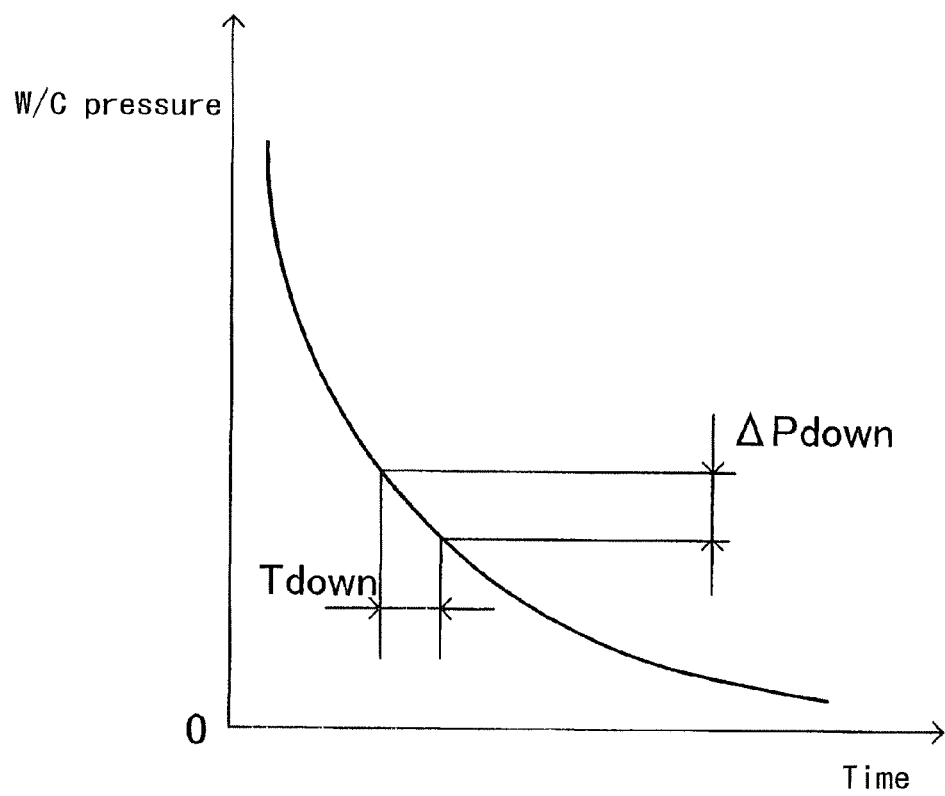
FIG. 7 illustrates a graph indicating a pressure reducing characteristic of a wheel cylinder pressure relative to the time when a pressure reducing valve is maintained in an opened state.
Figure 8:
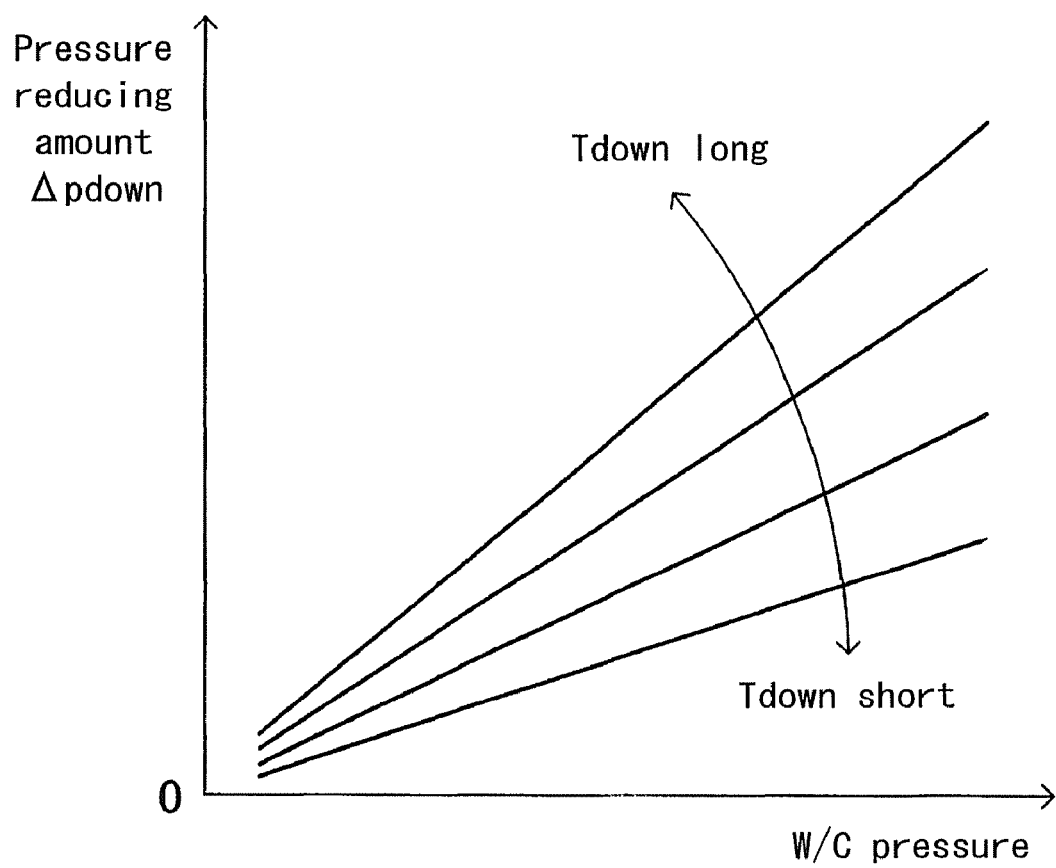
FIG. 8 illustrates a graph indicating a relation among a wheel cylinder pressure, a time period and a pressure reducing amount of the wheel cylinder pressure, while the pressure reducing valve is maintained in an opened state.

Once the first ABS control is started, the pressure reducing control is executed first. As illustrated in FIGS. 7 and 8, a pressure reducing amount ΔPdown of the wheel cylinder pressure (hereinafter referred to also as W/C pressure) generated by the operation of the pressure reducing valve PD during the pressure reducing control is determined depending on the wheel cylinder pressure and a time period Tdown during which the pressure reducing valve PD is maintained in an opened state. Setting the time period Tdown to be a constant value, the pressure reducing amount ΔPdown varies in proportion to the wheel cylinder pressure. Such pressure reducing characteristic, by use of the pressure reducing valve PD, can be obtained in advance through a predetermined examination or a simulation.

The brake apparatus 10 estimates the wheel cylinder pressure estimated value Pw, which is reduced from the wheel cylinder pressure estimated initial value Pw0 during the pressure reducing control, by use of the pressure reducing amount ΔPdown, which is obtained from the table illustrated in FIG. 8 (see the time t1 through t1' in FIG. 5). Thus, the pressure difference estimated value calculated by the formula (2) is increased from the additional pressure value Pup being an initial value.

After the pressure reducing control is terminated, the linear pressure increasing control is sequentially executed. An increase slope of the wheel cylinder pressure during the linear pressure increasing control is set (designed) to an appropriate value in advance. Thus, the brake apparatus 10 estimates the wheel cylinder pressure estimated value Pw, which is increased from the wheel cylinder pressure estimated value Pw at the ending point of the pressure reducing control, keeping the predetermined slope, during the linear pressure increasing control (see the time t1' through the time t2 in FIG. 5). Thus, the pressure difference estimated value Pdiff calculated by use of the formula (2) is reduced from the value at the ending point of the pressure reducing control.

Thus, by setting the wheel cylinder pressure estimated value Pw (=wheel cylinder pressure estimated initial value Pw0) at the starting point of the first ABS control, the wheel cylinder pressure estimated value Pw, which varies during the first ABS control, can be sequentially obtained. Thus, setting the wheel cylinder pressure estimated value Pw at the starting point of the second ABS control (in other words, the starting point of the pressure reducing control) so as to be equal to the wheel cylinder pressure estimated value Pw at the ending point of the linear pressure increasing control during the first ABS control, the wheel cylinder pressure estimated value Pw, which varies during the second ABS control, can also be sequentially obtained in the same manner as the first ABS control (see the time t2 through the time t3 in FIG. 5).

A wheel cylinder pressure estimated value Pw on and after the third ABS control can be sequentially obtained by repeating the above processes. In this way, the brake apparatus 10 can sequentially obtain the wheel cylinder pressure estimated value, which varies during the ABS control continuously repeated a number of times, by use of the wheel cylinder pressure estimated initial value Pw0. Accordingly, the pressure difference estimated value Pdiff, which is calculated by means of the formal (2), can be sequentially estimated and calculated on the basis of the wheel cylinder pressure estimated value Pw (see FIG. 5).

Assuming that a calculation cycle of the wheel cylinder pressure estimated value Pw (an interval of examination of the calculation program for the wheel cylinder pressure estimated value Pw, which will be described later, e.g., 8 msec) is Δt, and a change amount of the wheel cylinder pressure estimated value Pw is DP, the wheel cylinder pressure estimated value Pw that varies during the ABS control can be obtained by use of formula (3) in consideration of the initial value Pw0. Accordingly, the pressure difference estimated value Pdiff can also be obtained by use of formula (4) in consideration of the initial value being Pup.

$$Pw = Pw0 + \Sigma DP \quad (3)$$

$$Pdiff = Pup - \Sigma DP \quad (4)$$

Estimating the wheel cylinder pressure estimated value Pw by means of the above mentioned method, as illustrated in FIG. 5, even when the wheel cylinder pressure estimated initial value Pw0 is set to a different value, to some extent, from the actual wheel cylinder pressure Pwact at the starting point of the first ABS control, the wheel cylinder pressure estimated value Pw varies so as to gradually come close to the actual wheel cylinder pressure Pwact as time passes.

This is because the wheel cylinder pressure estimated value Pw during the pressure reducing control is estimated by use of the pressure reducing amount ΔPdown obtained from the table illustrated in FIG. 8 as mentioned above. The pressure reducing amount ΔPdown becomes larger as the wheel cylinder pressure becomes larger. Thus, as illustrated in FIG. 5, for example, when the wheel cylinder pressure estimated value Pw is larger than the actual wheel cylinder pressure Pwact, the total reducing amount of the wheel cylinder pressure estimated value Pw during the pressure reducing control becomes larger than the total reducing amount of the actual wheel cylinder pressure Pwact during the pressure reducing control.

As a result, as the pressure reducing control is repeatedly executed by repeatedly executing the ABS control, the wheel cylinder pressure estimated value Pw gradually comes close to the actual wheel cylinder pressure Pwact.

On the other hand, when the wheel cylinder pressure estimated value Pw is smaller than the actual wheel cylinder pressure Pwact, the total reducing amount of the wheel cylinder pressure estimated value Pw during the pressure reducing control becomes smaller than the total reducing amount of the actual wheel cylinder pressure Pwact during the pressure reducing control. Thus, in this case, as the pressure reducing control is repeatedly executed by repeatedly executing the ABS control, the wheel cylinder pressure estimated value Pw gradually comes close to the actual wheel cylinder pressure Pwact.

Thus, estimating the wheel cylinder pressure estimated value Pw by means of the abovementioned method, after the starting point of the first ABS control, as time passes, accuracies of the wheel cylinder pressure estimated value Pw and the pressure difference estimated value Pdiff are gradually enhanced.

(Description of Yaw Moment Control)

Figure 9:
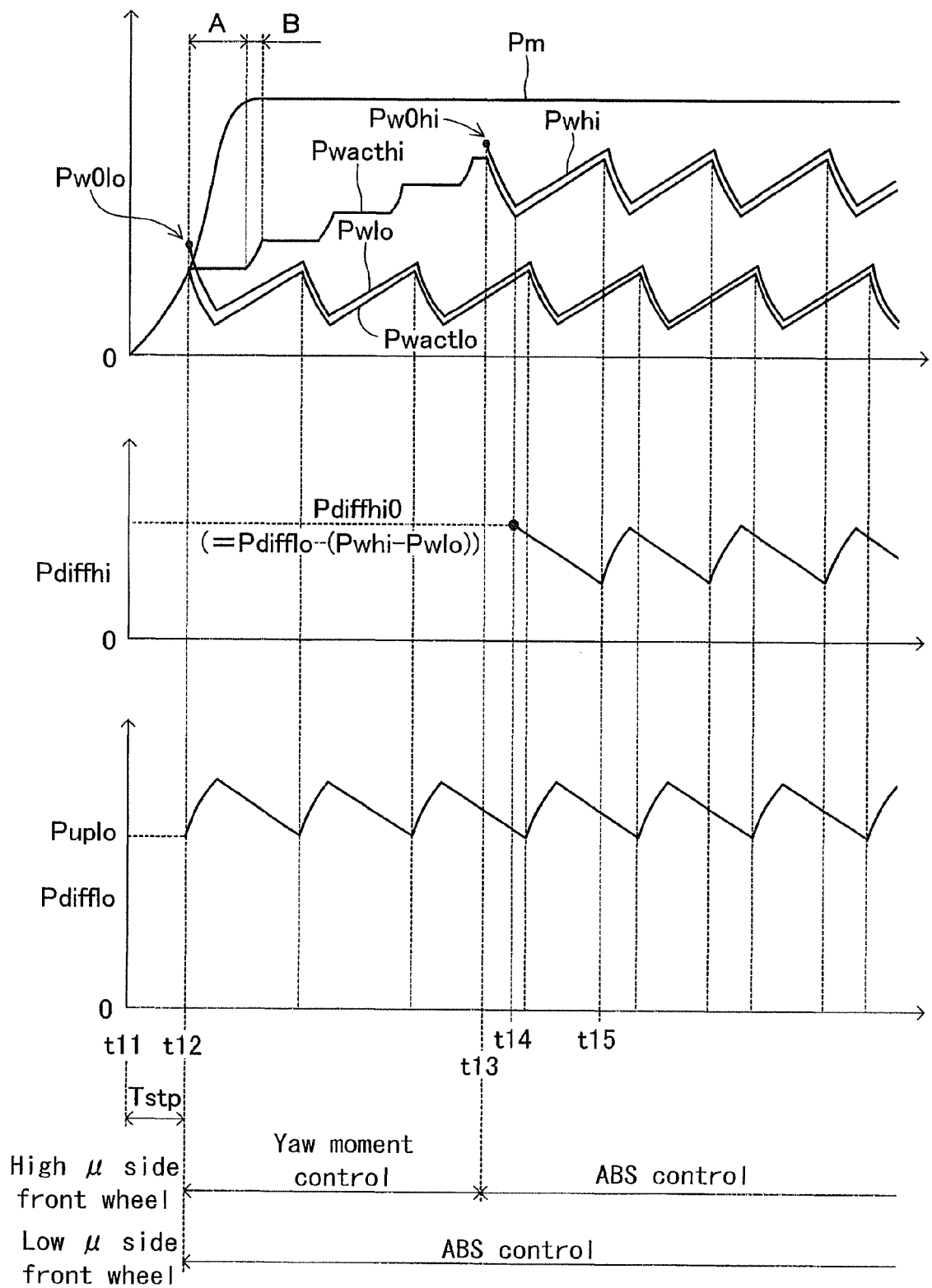
FIG. 9 illustrates time charts indicating examples of variations of physical values in case where the ABS control is started and executed for the first front wheel and a yaw moment control is started and executed for the second front wheel since the time t12, and then the ABS control is started and executed instead of the yaw moment control for the second front wheel since the time t13.

Next, a description of a yaw moment control executed by the brake apparatus 10 will be explained in accordance with FIG. 9. FIG. 9 illustrates examples of time charts each indicating variations of a master cylinder pressure Pm, an actual wheel cylinder pressure of the first front wheel (a first front wheel actual wheel cylinder pressure Pwactlo), a wheel cylinder pressure estimated value Pwlo of the first front wheel, an actual wheel cylinder pressure of the second front wheel (a second front wheel actual wheel cylinder pressure Pwacthi), a wheel cylinder pressure estimated value Pwhi of the second front wheel, a pressure difference estimated value Pdifflo of the first front wheel, and a pressure difference estimated value Pdiffhi of the second front wheel, when the ABS control is started and executed for the first front wheel from time t12, and the ABS control is started and executed for the second front wheel from time t13, in a case where the driver operates the brake pedal BP from time t11. In this example, in a case where the braking operation is executed by the driver when the vehicle is driven on the split road, the first front wheel contacts a low μ side front wheel, and the second front wheel contacts a high μ side front wheel.

As indicated in FIG. 9, according to the first front wheel, the brake apparatus 10 calculates and updates the wheel cylinder pressure estimated value Pwlo by use of the formula (3) from the time t12, which is the starting point of the first ABS control, at the same time, the brake apparatus 10 calculates and updates the pressure difference estimated value Pdifflo by use of the formula (4).

According to the second front wheel, when the predetermined yaw moment control start condition is established, the brake apparatus 10 executes the yaw moment control from the time t12, which is the starting point of the first ABS control for the first front wheel, to the time t13, which is the starting point of the first ABS control for the second front wheel. The yaw moment control start condition is established when the ABS control for at least one of the front wheels is started, and formula DVso<DVso1 is fulfilled. The DVso1 is a predetermined constant number.

In the yaw moment control of this example, for the second front wheel, a sustaining control continuing for a predetermined time A and a pressure increasing control continuing for a predetermined time B are alternately executed. Accordingly, as the master cylinder pressure Pm is increased, the increment of the second front wheel actual wheel cylinder pressure Pwacthi is restrained as illustrated in FIG. 9, as a result, the yawing moment caused by a difference between the braking force generated at the right front wheel and the braking force generated at the left front wheel (a friction force generated between the tire and the road surface) is reduced.

As a result, incidences caused by instability of the condition of the driven vehicle can be reduced. During the yaw moment control, the wheel cylinder pressure estimated value Pwhi and the pressure difference estimated value Pdiffhi for the second front wheel are not calculated.

In this configuration, for example, when the braking operation is intensely executed when the vehicle is driven on the split road, from the starting point of the ABS control for the first front wheel, the yaw moment control is executed for the second front wheel, and then the ABS control is executed for the second front wheel instead of the yaw moment control.

(Calculation of Pressure Difference Estimated Value Pdiffhi During ABS Control for Second Front Wheel)

As illustrated in FIG. 9, when the brake fluid pressure for the second front wheel is changed from the yaw moment control to the ABS control, the brake apparatus 10 calculates and updates the wheel cylinder pressure estimated value Pwhi at the second front wheel from the starting point of the first ABS control (time t13 in FIG. 9) by use of the formula (3) in the same manner as for the first front wheel.

On the other hand, according to the pressure difference estimated value Pdiffhi at the second front wheel, the brake apparatus 10 calculates and updates the pressure difference estimated value Pdiffhi by use of formula (5), instead of the formula (4) or the formula (2), after the starting point of the linear pressure increasing control (time t14 in FIG. 9) during the ABS control where a pressure difference estimated value Pdiffhi is substantially required.

$$P\text{diffhi} = P\text{diffhi}0 - \Sigma DP \quad (5)$$

In the formula (5), the Pdiffhi0 indicates a second front wheel pressure difference estimated initial value (corresponding to the pressure difference estimated value at specific time), which is a pressure difference estimated value Pdiffhi for the second front wheel at the starting point (corresponding to the specific time, time 14 in FIG. 9) of the linear pressure increasing control during the first ABS control for the second front wheel.

The second front wheel pressure difference estimated initial value Pdiffhi0 is calculated following formula (6) by use of a relation of formula "an actual pressure difference of the second front wheel equals an actual pressure difference of the first front wheel minus (a wheel cylinder pressure of the second front wheel minus a wheel cylinder pressure of the first front wheel)". Each parameter of the right side of the formula (6) indicates values at the starting point of the linear pressure increasing control during the first ABS control for the second front wheel.

$$P\text{diffhi}0 = P\text{difflo} - (P\text{whi} - P\text{wlo}) \quad (6)$$

Effects of the calculation and updating of the pressure difference estimated value Pdiffhi of the second front wheel by use of the formula (5) instead of the formula (4) (or the formula (2)) will be explained.

At the starting point of the linear pressure increasing control (the time t14 in FIG. 9) during the first ABS control for the second front wheel, because the ABS control for the first front wheel has been executed and continued for a certain time period (for a time period between the time t12 and the time t14 in FIG. 9), estimation accuracies of at least the wheel cylinder pressure estimated value Pwlo for the first front wheel and the pressure difference estimated value Pdifflo for the first front wheel are enhanced.

Accordingly, using the formula (6) instead of the formula (4), the pressure difference estimated value Pdiffhi(=Pdiffhi0) at the starting point of the linear pressure increasing control during the first ABS control for the second front wheel will be calculated with high accuracy.

Further, the pressure difference estimated value Pdiffhi for the second front wheel at the starting point of the linear pressure increasing control during the first ABS control for the second front wheel is calculated and updated by use of the formula (5) by setting the second front wheel pressure difference estimated initial value Pdiffhi0 as an initial value, as a result, the pressure difference estimated value Pdiffhi can be continuously calculated with high accuracy.

(Increasing and Decreasing Process of the Pressure Difference Estimated Value Pdiffhi for the Second Front Wheel)

When the second front wheel pressure difference estimated initial value Pdiffhi0 calculated by use of the formula (6) is larger than the actual pressure difference, an "increase start delay at wheel cylinder pressure" occurs at the second front wheel, and when the second front wheel pressure difference estimated initial value Pdiffhi0 is smaller than the actual pressure difference, a "rapid increase of wheel cylinder pressure" occurs at the second front wheel. In the light of stability maintenance of the vehicle, it is considered that the "rapid increase of wheel cylinder pressure" should be dealt with first. Thus, it is better to set the second front wheel pressure difference estimated initial value Pdiffhi0 to be a relatively large value.

The brake apparatus 10 actually calculates the second front wheel pressure difference estimated initial value Pdiffhi0 by use of formula (7) instead of the formula (6). In this formula, a coefficient h is a positive constant value below "1" (e.g., 0.7), and the value P0 is a positive constant value (corresponding to the "addition value"). Thus, the second front wheel pressure difference estimated initial value Pdiffhi0 is set to a value being relatively larger than the value obtained by use of the formula (6). In this formula, the value "(Pwhi−Pwlo)*h" corresponds to a value being smaller than the wheel cylinder pressure difference.

$$Pdiffhi0 = Pdifflo - (Pwhi - Pwlo) \cdot h + P0 \tag{7}$$

A case in which the second front wheel pressure difference estimated initial value Pdiffhi0 is set to be relatively larger than the actual pressure difference, by setting the second front wheel pressure difference estimated initial value Pdiffhi0 to be a relatively large value by use of the formula (7), will be explained below.

Figure 10:
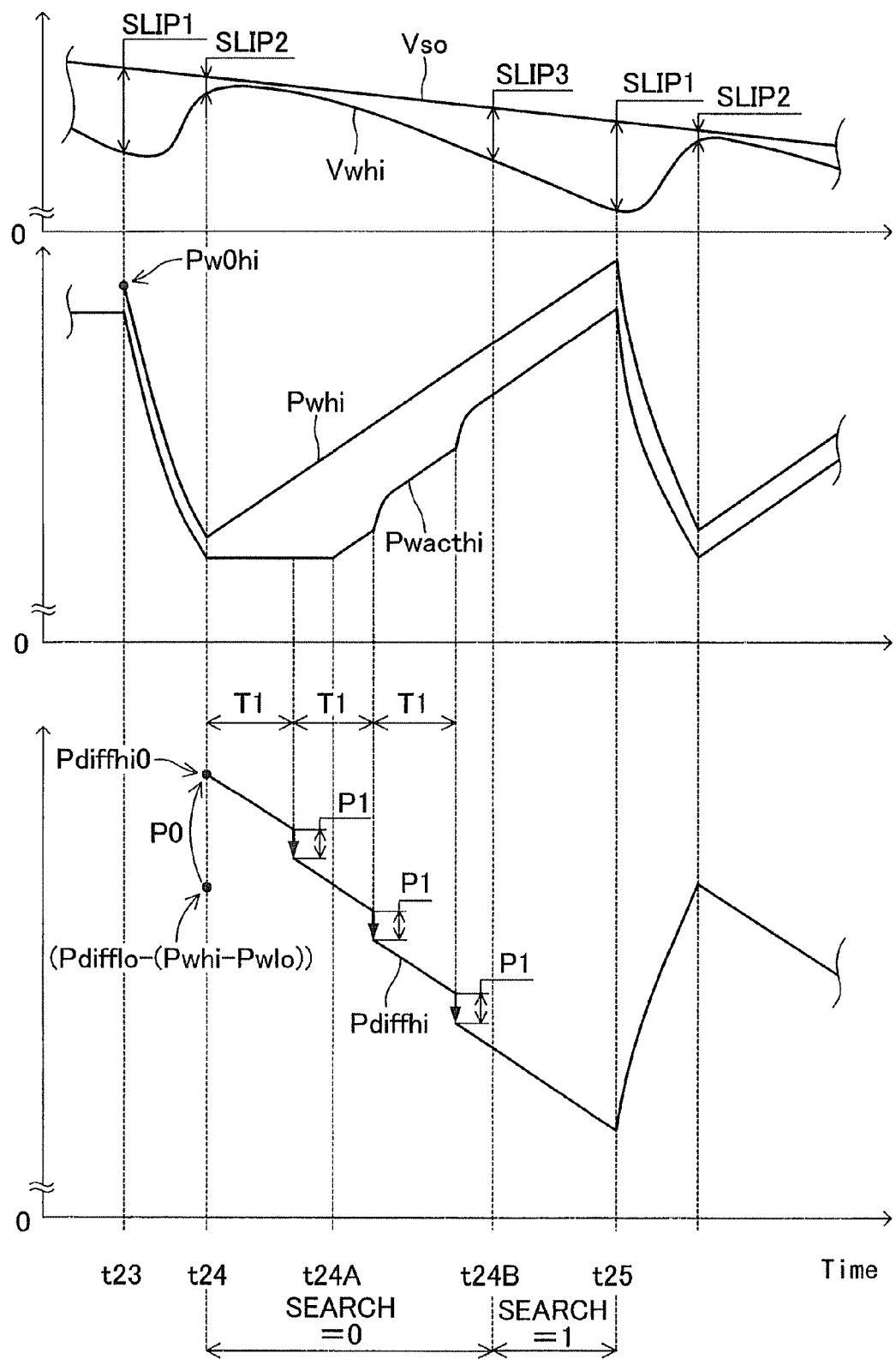
FIG. 10 illustrates time charts corresponding to the time charts in FIG. 9 for explaining a pressure difference reducing process executed for the second front wheel.

FIG. 10 illustrates time charts, which corresponds to the time charts illustrated in FIG. 9, indicating examples of variations of a vehicle speed Vso, a wheel speed Vwhi of the second front wheel, a second front wheel actual wheel cylinder pressure Pwacthi, a wheel cylinder pressure estimated value Pwhi of the second front wheel, and the pressure difference estimated value Pdiffhi of the second front wheel. Times t23, t24 and t25 in FIG. 10 correspond to the times t13, t14 and t5 in FIG. 9 respectively.

In this case, as illustrated in FIG. 10, after the time t24 being the starting point of the linear pressure increasing control during the first ABS control for the second front wheel, during a time period in which the pressure difference estimated value Pdiffhi, which is updated by use of the formula (5), is reduced so as to reach the actual pressure difference, the second front wheel actual wheel cylinder pressure Pwacthi is sustained to be constant.

Specifically, the above-mentioned "increase start delay at wheel cylinder pressure" occurs at this point. Accordingly, it is better to control the level of the "increase start delay at wheel cylinder pressure" to be as small as possible.

As illustrated in FIG. 10 during the linear pressure increasing control after time t24, the brake apparatus 10 sets the pressure difference estimated value Pdiffhi by subtracting a predetermined subtraction value P1 (constant value) therefrom each time a predetermined time T1 passes. Specifically, the pressure difference estimated value Pdiffhi is corrected so as to be in a stepped shape. This process will be referred to as a "pressure difference reducing process".

By means of the pressure difference reducing process, a timing when the pressure difference estimated value Pdiffhi is reduced and reaches the actual pressure difference, in other words, a timing when the second front wheel actual wheel cylinder pressure Pwacthi is increased (the time t24 in FIG. 10), can be advanced.

There is no need to execute the pressure difference reducing process after the timing when the pressure difference estimated value Pdiffhi is reduced and reaches the actual pressure difference. Once the second front wheel actual wheel cylinder pressure Pwacthi is increased, the slip amount SLIPhi of the second front wheel also starts increasing.

The brake apparatus 10 terminates the pressure difference reducing process at a point where the slip amount SLIPhi at the second front wheel exceeds the value SLIP3 (a time t24B in FIG. 10). At this point, a relation SLIP2<SLIP3<SLIP1 is fulfilled.

Specifically, after the point at which the slip amount SLIPhi at the second front wheel exceeds the value SLIP3, the pressure difference estimated value Pdiffhi is not set by subtracting the subtraction value P1.

Figure 11:
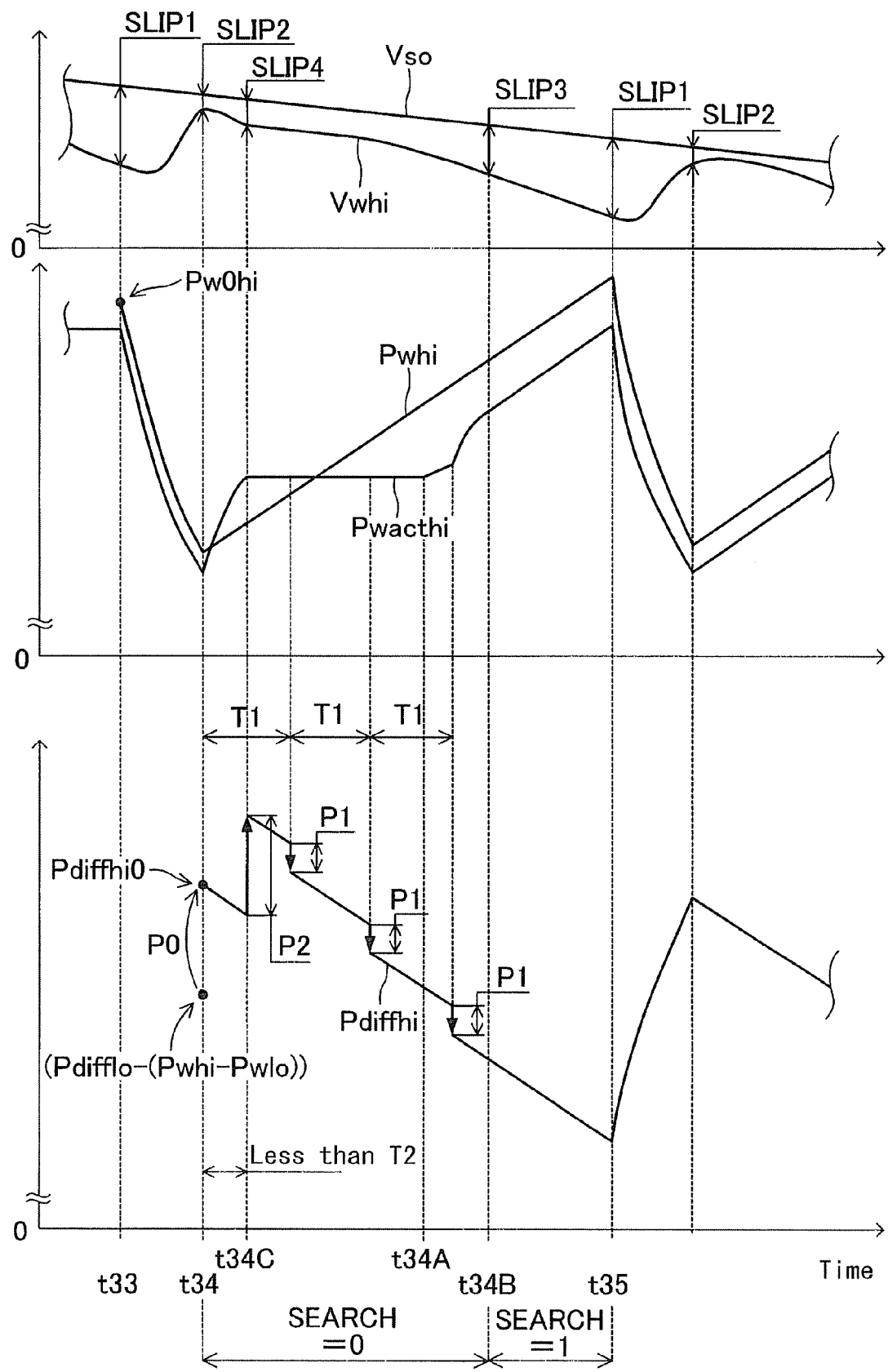
FIG. 11 illustrates time charts corresponding the time charts in FIG. 9 for explaining a pressure difference increasing process executed for the second front wheel.

On the other hand, even when the second front wheel pressure difference estimated initial value Pdiffhi0 is calculated so as to be relatively large by use of the formula (7), the second front wheel pressure difference estimated initial value Pdiffhi0 may be smaller than the actual pressure difference. FIG. 11 illustrates time charts of examples corresponding to the time charts illustrated in FIG. 10. Times t33, t34, t34A, t34B and t35 indicated in FIG. 11 correspond to times t23, t24, t24A, t24B, t25 indicated in FIG. 10.

As illustrated in FIG. 11, after the time t34 being the starting point of the linear pressure increasing control during the first ABS control for the second front wheel, the second front wheel actual wheel cylinder pressure Pwacthi is rapidly increased, in other words, a "rapid increase of wheel cylinder pressure" occurs. In this case, such rapid increase of the second front wheel actual wheel cylinder pressure Pwacthi should be restrained immediately. Further, if the second front wheel actual wheel cylinder pressure Pwacthi is rapidly increased, the slip amount SLIPhi of the second front wheel will be rapidly increased.

Thus, the brake apparatus 10 executes the pressure difference reducing process. Further, as illustrated in FIG. 1, when the slip amount SLIPhi exceeds the value SLIP4 before a predetermined first time period T2 passes after the time t34 (the time t34C in FIG. 1, which corresponds to the second condition), the brake apparatus 10 sets the pressure difference estimated value Pdiffhi at this point by adding a predetermined increasing value P2 (in other words, corrects the pressure difference estimated value Pdiffhi so as to be in a stepped shape). This process will be referred to as a "pressure difference increasing process". A relation of SLIP2<SLIP4<SLIP3 is established.

The smaller the wheel acceleration Dvwhi for the second front wheel at this point is (in other words, the larger a value obtained by subtracting Dvwhi from the vehicle wheel deceleration is), the larger the increasing value P2 will be. This is because the value calculated by subtracting the DVwhi from the vehicle wheel deceleration at this point becomes larger as a shortage of the pressure difference estimated value Pdiffhi relative to the actual pressure difference becomes larger.

Thus, by executing the pressure difference increasing process, the pressure difference estimated value Pdiffhi, being by adding the increasing value P2, is surely set to be larger than the actual pressure difference, as a result, the following rapid increasing of the second front wheel actual wheel cylinder pressure Pwacthi can be certainly reduced (see after time t34C in FIG. 11).

(Actual Operation)

Next, an operation of the brake apparatus for a vehicle 10 will be explained, in accordance with flowcharts illustrated in FIGS. 12 through 17 indicating routines executed by the CPU 51 of the ECU 50.

Figure 12:
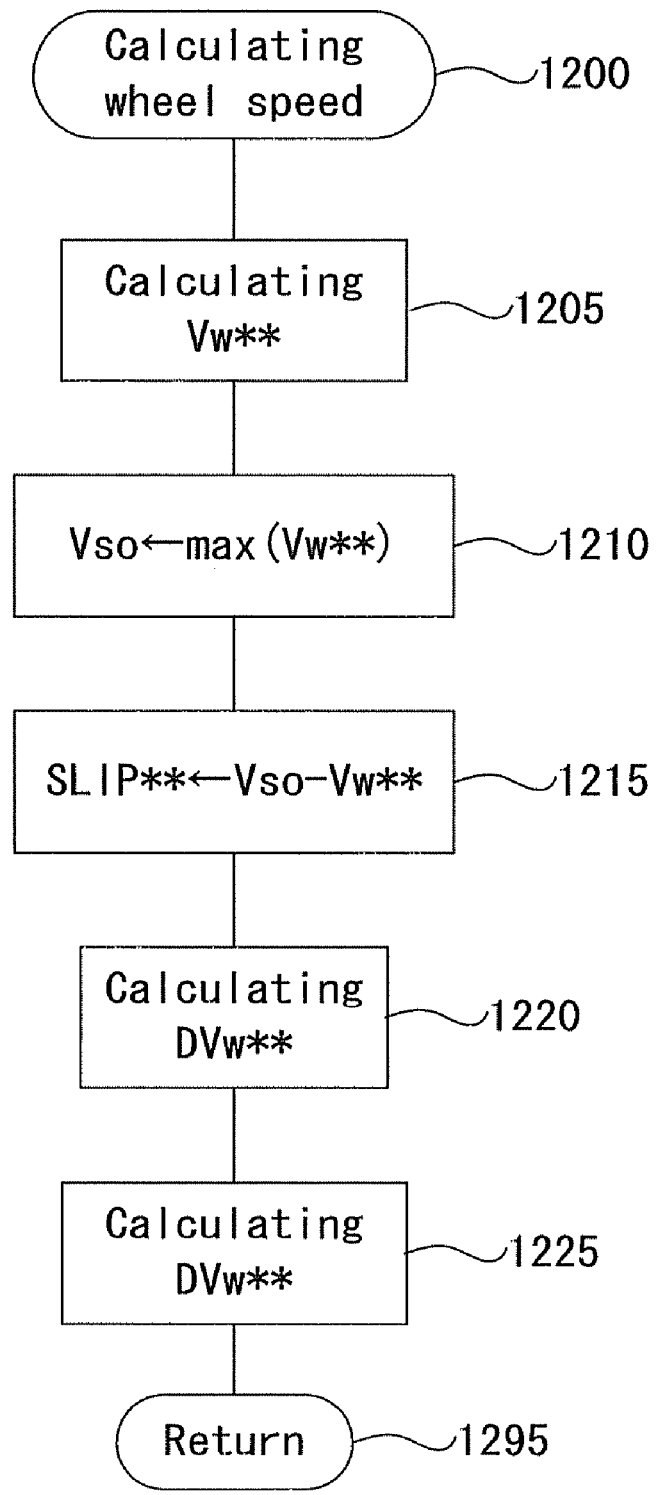
FIG. 12 illustrates a flowchart indicating a routine for calculating a wheel speed and the like executed by a CPU illustrated in FIG. 1.

The CPU 51 repeats a routine illustrated in FIG. 12, in order to calculate a wheel speed or the like, each time a predetermined time passes. Specifically, the CPU 51 starts a process from Step 1200 and proceeds to Step 1205. In Step 1205, a wheel speed (a speed at a periphery of a tire at the wheel ) Vw is calculated. Specifically, the CPU 51 calculates the wheel speed Vw on the basis of an interval of pulse included in a signal outputted by the wheel speed sensor 41**.

Then, the CPU 51 proceeds to Step 1210. In Step 1210, an maximum value of the wheel speed Vw is calculated as a vehicle speed Vso. At this point, an average value of the wheel speed Vw may be calculated as the vehicle speed Vso. Then, the CPU 51 proceeds to Step 1215. In Step 1215, a slip amount SLIP at the wheel  is calculated on the basis of the formula (1) by use of the vehicle speed Vso calculated in Step 1210 and the wheel speed Vw** calculated in Step 1205.

The CPU 51 further proceeds to Step 1220. In Step 1220, a wheel acceleration DVw at the wheel  is calculated as a time derivative at the wheel speed  by use of a following formula (8). In the formula (8), Vw1 indicates the wheel speed Vw** calculated in Step 1205 when the current routine is previously executed, and Δt indicates a predetermined time (an execution cycle of the current routine by the CPU 51).

$$DVw^{}=(Vw^{}-Vw1^{**})/\Delta t \quad (8)$$

Then, the CPU 51 proceeds to Step 1225. In Step 1225, a vehicle deceleration Dvso, which is obtained by reversing the sign of the time derivative of the vehicle speed Vso in accordance with a following formula (9), is calculated, and then the CPU 51 proceeds to Step 1295. In Step 1295, the current routine is temporarily terminated. The Vso1 in the formula (9) is the vehicle speed Vso calculated in Step 1210 when the current routine is previously executed.

$$DVso=-(Vso-Vso1)/\Delta t \quad (9)$$

Further, The CPU 51 repeats a routine for determining a start and a termination of the ABS control, at each wheel, each time a predetermined time passes.

Thus, at a predetermined timing, the CPU 51 starts a process from Step 1300 and proceeds to Step 1305. In Step 1305, the CPU 51 determines whether or not the parameter CYCLE  is "0". When the value of the parameter CYCLE  is "0", it indicates that the ABS control is not executed at the wheel , and when the value of the parameter CYCLE  is "n" (positive integer), it indicates that the ABS control of round N is executed Assuming that the ABS control is not executed for the wheel , and the ABS control start condition is not established, because the parameter CYCLE  is "0", the CPU 51 determines "Yes" in Step 1305 and proceeds to Step 1310. In Step 1310, the CPU 51 determines whether or not the brake switch 42 outputs an ON signal. When the CPU 51 determines "No" in Step 1310, the CPU 51 proceeds to Step 1315. In Step 1315, the Counter Tstp** is initialized and set to "0".

On the other hand, when the CPU 51 determines "Yes" in Step 1310, the CPU 51 proceeds to Step 1320. In Step 1320, the counter Tstp is increased by 1. At this point, the counter Tstp indicates a continuation time of the brake pedal BP operation by the driver.

Then, the CPU 51 proceeds to Step 1325. In Step 1325, the CPU 51 determines whether or not the ABS control start condition is established for the wheel . At this point, a newest value calculated in Step 1215 is used as the SLIP, and a newest value calculated in Step 1220 is used as the DVw**.

At the present moment, because the ABS control start condition is not established at the wheel , the CPU 51 determines "No" in Step 1325 and proceeds to Step 1395. In Step 1395, the current routine is temporally terminated. This process is repeated until the ABS control start condition is established at the wheel .

Next, in this condition, it is considered that the ABS control start condition is established at the wheel  (=first front wheel lo) (see the time t12 in FIG. 9), when the driver operates the brake pedal BP of the vehicle running on the split road. Hereinbelow, assuming that the wheel  is the first front wheel lo, the routine will be further explained.

In this case, when the CPU 51 proceeds to Step 1325 determines "Yes", the CPU 51 proceeds to Step 1330. In Step 1330, the parameter CYCLE (=CYCLE lo) is changed from "0" to "1", and then the CPU 51 proceeds to Step 1335. In Step 1335, the parameter Mode(=Modelo) is changed to "1". The parameter Mode of "1" indicates that the pressure reducing control is executed at the wheel , and the parameter Mode** "2" indicates that the linear pressure increasing control is executed.

Then, the CPU 51 proceeds to Step 1340. In Step 1340, a braking operation time period before ABS control Tstps (=Tstpslo) is set to be equal to the counter Tstp(=Tstplo) updated in Step 1320 at the present moment. Accordingly, the braking operation time period before ABS control Tstpslo is set so as to correspond to a time period from the starting point of the brake pedal BP operation to the starting point of the first ABS control for the first front wheel lo.

Then, the CPU 51 proceeds to Step 1345. In Step 1345, on the basis of a newest value of the vehicle deceleration Dvso calculated in Step 1225 (a value at the starting point of the first ABS control for the first front wheel lo) and the predetermined table, a locking pressure Plock(=Plocklo) is determined, and the CPU 51 proceeds to Step 1350. In Step 1350, the wheel cylinder pressure estimated initial value Pw0 (=Pw0lo) is set so as to be equal to the locking pressure Plock**(=Plocklo). The CPU 51 thus constitutes wheel cylinder pressure estimated initial value calculating means for calculating a wheel cylinder pressure estimated initial value.

Then, the CPU 51 proceeds to Step 1355. In Step 1355, the additional pressure value Pup(=Puplo) is calculated on the basis of the braking operation time period before ABS control Tstps(=Tstpslo) and the table illustrated in FIG. 6. The CPU 51 further proceeds to Step 1360. In Step 1360, the pressure difference estimated value Pdiff(=Pdifflo) is set to an initial value Pup(=Puplo), and then the CPU 51 proceeds to Step 1365. In Step 1365, the wheel cylinder pressure estimated value Pw(=Pwlo) is set to an initial value Pw0 (=Pw0lo), and then the CPU 51 proceeds to Step 1395 and temporary terminates the current routine.

Subsequently, the CPU 51 determines "No" in Step 1305 and proceeds to Step 1370. In Step 1370, it is monitored whether or not the ABS control termination condition is established at the wheel  (=first front wheel lo). The ABS control termination condition is established when the brake switch 42 outputs an OFF signal (in other words, the driver has finished the braking operation at the brake pedal BP), or when a state of "Mode=2" (in other words, a state where the linear pressure increasing control is executed) continues for more than a predetermined time Tref.

At the present moment immediately after the ABS control start condition at the first front wheel lo is established, the CPU 51 determines "No" in Step 1370. Until the ABS control termination condition is established at the first front wheel lo in Step 1370, the CPU 51 repeats the processes in Steps 1305 and 1370. While the process for the first front wheel lo has been repeated, the CPU 51 repeats the ABS control, which is comprised of the pressure reducing control and the linear pressure increasing control, for the wheel  (=first front wheel lo) by executing the routines illustrated in FIGS. 15 through 17 (See after the time 12 in FIG. 9**).

Figure 14:
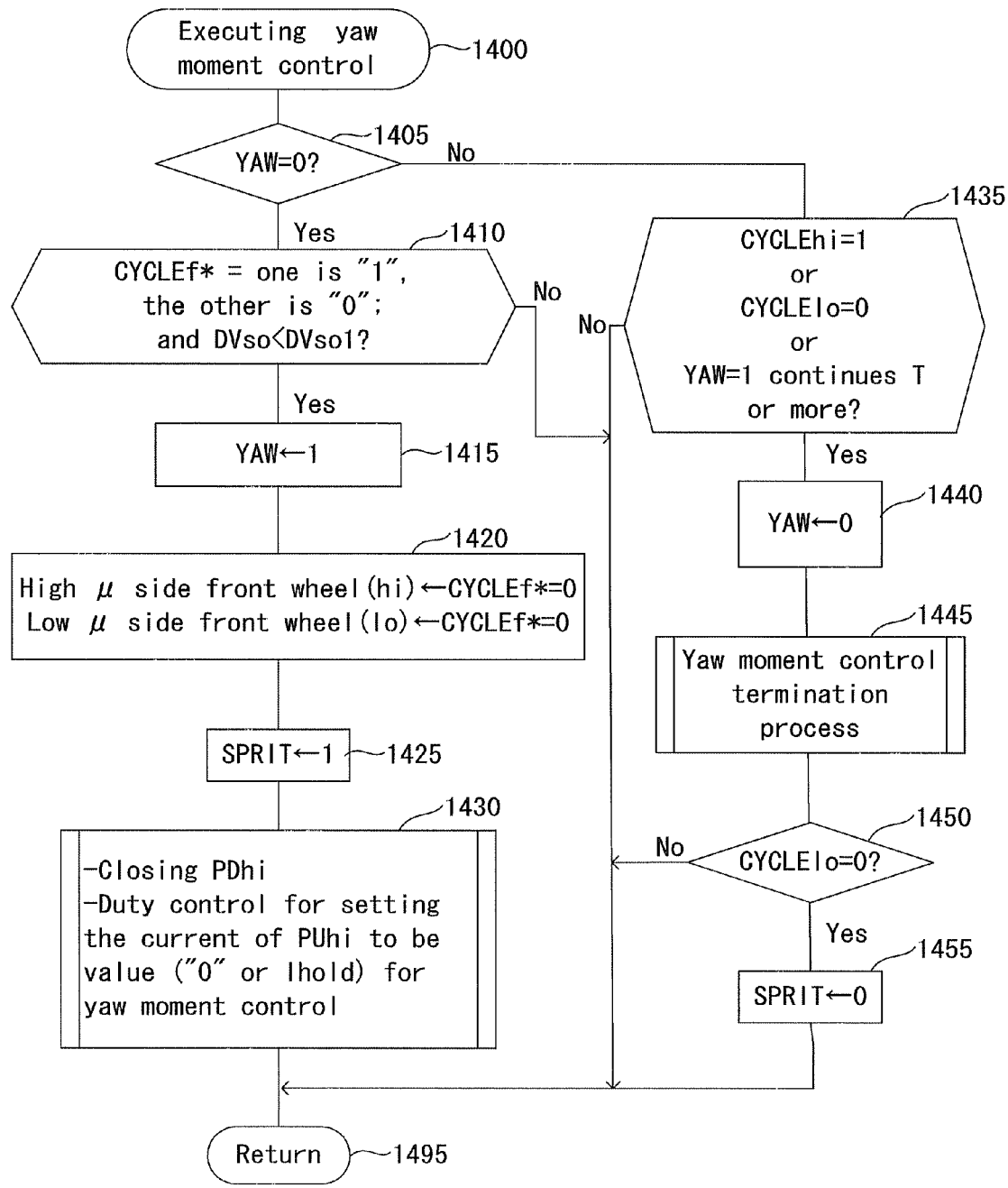
FIG. 14 illustrates a flowchart indicating a routine for executing the yaw moment control by the CPU illustrated in FIG. 1.

Further, the CPU 51 executes a routine for executing the yaw moment control as illustrated in FIG. 14 each time a predetermined time passes. In this regard, the CPU 51 constitutes yaw moment control means for executing yaw moment control. Specifically, at the predetermined timing, the CPU 51 starts a process at from Step 1400 and then proceeds to Step 1405. In Step 1405, the CPU 51 determined whether or not a flag YAW is "0". At this point, the flag YAW being "1" indicates that the yaw moment control is being executed, and the flag YAW being "0" indicates that the yaw moment control is not being executed.

As indicated at the time t12 in FIG. 9, it is assumed that the process in Step 1405 is executed immediately after the ABS control start condition is established only at the first front wheel lo (CYCLE lo=1), and the yaw moment control start condition is established. In this case, because the yaw moment control is not executed at the present moment (YAW=0), the CPU 51 determines "Yes" in Step 1405 and then proceeds to Step 1410. In Step 1410, the CPU 51 determines whether or not the yaw moment control start condition is established. When the CPU 51 determines that the yaw moment control start condition is not established, it proceeds to Step 1495 and temporary terminates the current routine. At this point, a newest value calculated in Step 1225 is used as the Dvso.

At the present moment, because the yaw moment control start condition is established, the CPU 51 determines "Yes" in Step 1410 and proceeds to Step 1415. In Step 1415, the flag YAW is changed from "0" to "1". Then the CPU 51 proceeds to Step 1420. In Step 1420, a front wheel at which the flag CYCLE f* is "0" at the present moment is identified as a second front wheel hi, and a front wheel at which the flag CYCLE f* is "1" at the present moment is identified as a first front wheel lo.

Then, the CPU 51 proceeds to Step 1425 and sets a flag SPRIT to "1". In this step, the flag SPRIT being "1" indicates that the front wheels have been classified as the second front wheel hi and the first front wheel lo, and the flag SPRIT being "0" indicates that the front wheels have not classified as the second front wheel hi and the first front wheel lo.

Then, the CPU 51 proceeds to Step 1430. In Step 1430, the pressure reducing valve PDhi at the second front wheel hi is operated so as to be in a closed state, and the CPU 51 executes a duty control in order to set the conducting electric current value of the pressure increasing valve Puhi at the second front wheel hi so as to correspond to the yaw moment control (set to the value Ihold in FIG. 3 during the sustaining control and set to "0" during the pressure increasing control). Accordingly, the yaw moment control for the second front wheel hi is started.

Then, the CPU 51 proceeds to Step 1495 and temporary terminates the current routine. Subsequently, the CPU 51 determines "No" in Step 1405 and proceeds to Step 1435. In Step 1435, the CPU 51 determines whether or not the yaw moment control termination condition is established. At this point, the yaw moment control termination condition is established when the ABS control is started for the second front wheel hi (CYCLE hi=1), when the ABS control for the first front wheel lo is terminated (CYCLE lo=0), or when a state in which "YAW=1" continues for a predetermined time T or more.

Because it is immediately after the yaw moment control start condition is established (CYCLE hi=0, CYCLE lo=1), the CPU 51 determines "No" in Step 1435. Subsequently, the CPU 51 repeats the processes in Steps 1405 and 1435 until the yaw moment control termination condition is established (see the times t12 and t13 in FIG. 9). While the CPU 51 repeats the processes in Steps 1405 and 1435, the yaw moment control has been continuously executed by the process in Step 1430.

Further, the CPU 51 has been repeating the routine for executing the ABS control for each wheel each time a predetermined time passes. Accordingly, at a predetermined timing, the CPU 51 starts a process from Step 1500 and proceeds to Step 1502. In Step 1502, the CPU 51 determines whether or not the parameter CYCLE  is not "0" (in other words, whether or not the ABS control is executing for the wheel ), and when the CPU 51 determines that the parameter CYCLE  is "0", it proceeds to Step 1595** and temporary terminates the present routine.

As indicated at the time t12 in FIG. 9, it is assumed that the process is executed immediately after the ABS control start condition is established only at the first front wheel lo (CYCLE lo=1, SPRIT=1). In the following explanation, the wheel ** is considered as the first front wheel lo.

The CPU 51 determines "Yes" in Step 1502 and proceeds to Step 1504. In Step 1504, the CPU 51 determines whether or not the parameter Mode**(=Modelo) is "1".

At this point, because the parameter Mode(=Modelo) is changed to "1" in Step 1335, the CPU 51 determines "Yes" in Step 1504 and proceeds to Step 1506. In Step 1506, the pressure reducing valve PD(=PDlo) at the wheel  (=first front wheel lo) is operated so as to be opened, and the CPU 51 executes a duty control for the conducting electric current value so as to be equal to the pressure increasing valve PU (=PUlo) to the value Ihold (see FIG. 3). In this way, the pressure reducing control in the first ABS control for the wheel **(=first front wheel lo) is started and executed.

Then, the CPU 51 proceeds to Step 1508. In Step 1508, the CPU 51 calculates a change amount DP(=DPlo) (<0) of the wheel cylinder pressure estimated value Pw(=Pwlo) in a calculation cycle $\Delta t$ during the pressure reducing control, on the basis of the wheel cylinder pressure Pw(=Pwlo) (at the present moment, it is set to be equal to Pw0(=Pwlo) in Step 1365), the calculation cycle $\Delta t$ of the current routine executed by the CPU 51 and the table illustrated in FIG. 8.

Figure 16:
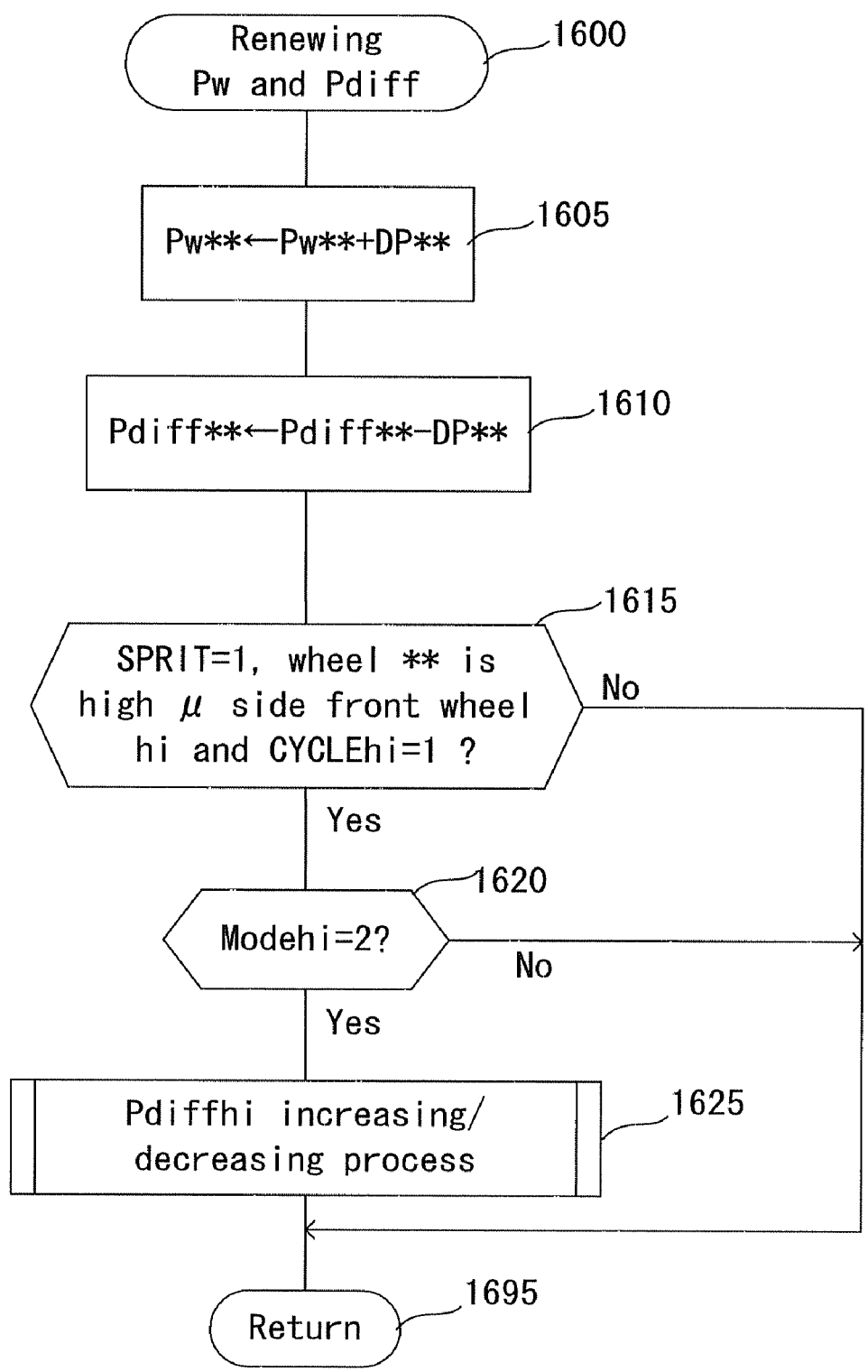
FIG. 16 illustrates a flowchart indicating a routine for updating the wheel cylinder pressure estimated value and the pressure difference estimated value by the CPU illustrated in FIG. 1.

Then, the CPU 51 proceeds to Step 1510 and further proceeds to Step 1600. In Step 1600, the CPU 51 starts a routine for updating Pw, Pdiff as illustrated in FIG. 16. Specifically, the CPU 51 proceeds to Step 1605 and updates the wheel cylinder pressure estimated value Pw(=Pwlo) to a value, which is obtained by adding the change amount DP calculated in Step 1508 to a current value (at the present moment, it is set to be equal to the wheel cylinder pressure estimated initial value Pw0(=Pw0lo) in Step 1365), by use of the formula (3). The CPU 51** thus constitutes wheel cylinder pressure estimated value calculating means for calculating a wheel cylinder pressure estimated value.

Then, the CPU 51 proceeds to Step 1610. In Step 1610, the pressure difference estimated value Pdiff(=Pdifflo) is updated to a value calculated by adding the change amount DP to the current value (at the present moment, it is set to be equal to the initial value Pup(=Puplo) in Step 1360), by use of the formula (4). Thus, the wheel cylinder pressure estimated value Pw(=Pwlo) and the pressure difference estimated value Pdiff(=Pdifflo) are updated. The CPU 51** thus constitutes pressure difference estimated value calculating means for calculating a pressure difference estimated value.

Then, the CPU 51 proceeds to Step 1615. In Step 1615, the CPU 51 determines whether or not the conditions in Step 1615 are fulfilled. When the CPU 51 determines "Yes", the CPU 51 proceeds to Step 1620 and determines whether or not the parameter Mode(=Modehi) is "2". Specifically, in the Steps 1615 and 1620, the CPU 51** determines whether or not the linear pressure increasing control in the first ABS control for the second front wheel hi is determined.

At the present moment, the flag SPRIT is set to "1" in Step 1425, however, the wheel  is the first front wheel lo, and the ABS control is not executed for the second front wheel, the flag CYCLE (=CYCLE hi) is "0". Thus, the CPU 51 determines "No" in Step 1615 and then proceeds to the Step 1695. Further, the CPU 51 proceeds to Step 1512 illustrated in FIG. 15.

In Step 1512, the CPU 51 determines whether or not the pressure increasing control start condition is established for the wheel  (=first front wheel lo). At the present moment, because it is immediately after the pressure reducing control is started, the SLIP(=SLIPlo) is set to be larger than the SLIP2. Accordingly, the CPU 51 determines "No" in Step 1512 and proceeds to Step 1595.

This process is repeated until the pressure increasing control start condition at the wheel  (first front wheel lo) is established. As a result, because the pressure reducing control of the first ABS control for the wheel  (=first front wheel lo) is continued and because the change amount DP (=DPlo) obtained in Step 1508 is negative, the wheel cylinder pressure estimated value Pw(=Pwlo) is gradually reduced, and the pressure difference estimated value Pdiff**(=Pdifflo) is increased.

Figure 15:
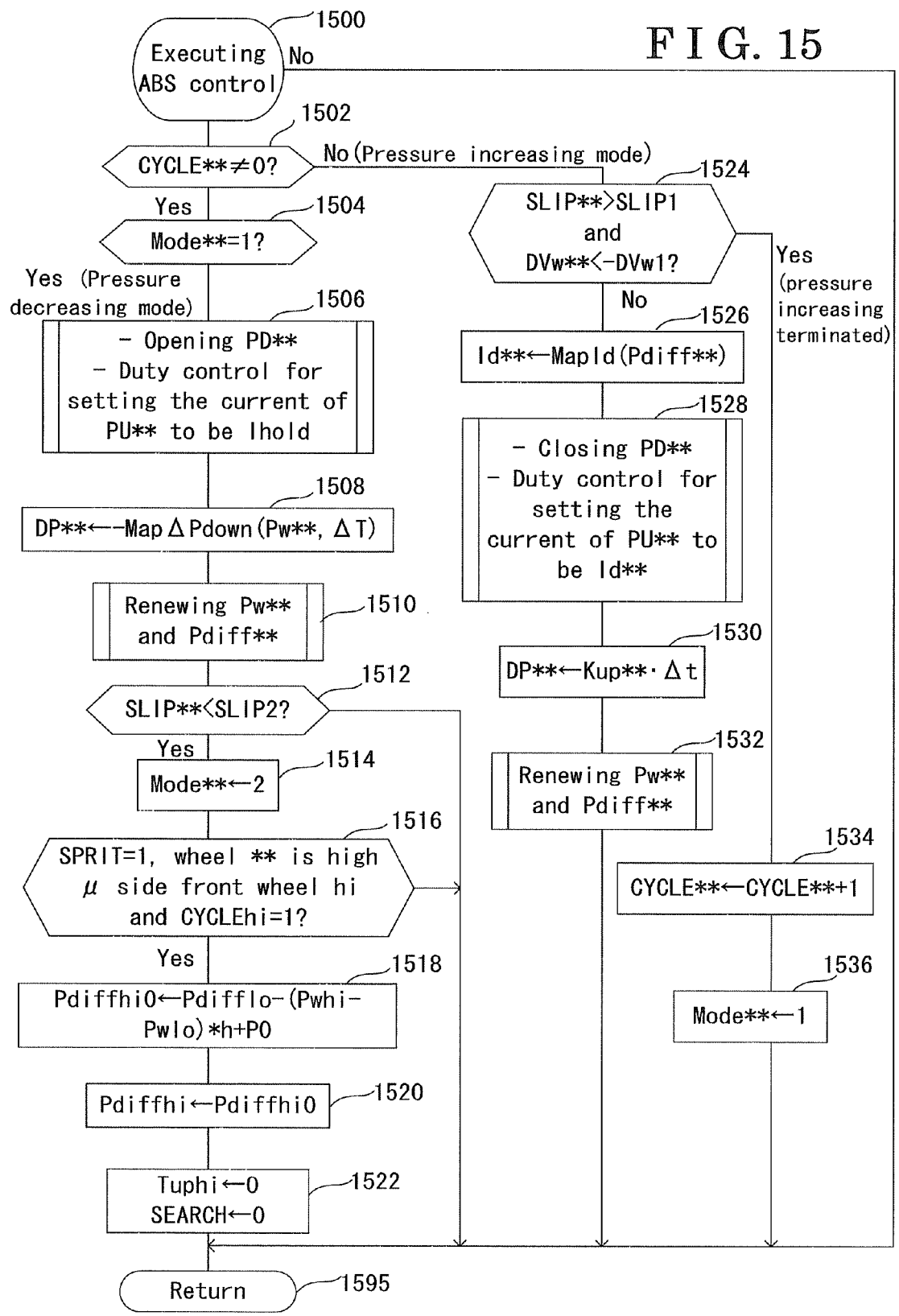
FIG. 15 illustrates a flowchart indicating a routine for executing the ABS control by the CPU illustrated in FIG. 1.

Then, after a predetermined time passes, and once the pressure increasing control start condition is established at the wheel  (=first front wheel lo), the CPU 51 determines "Yes" in Step 1512 illustrated in FIG. 15 and then proceeds to Step 1514. In Step 1514, the parameter Mode (=Modelo) is changed from "1" to "2", and the CPU 51 proceeds to Step 1516. In Step 1516, the CPU 51 determines whether or not the conditions, which are same in Step 1615, are fulfilled. At the present moment, the CPU determines "No" and proceeds to Step 1595.

Subsequently, because the parameter Mode(=Modelo) is set to "2", the CPU 51 determines "No" in Step 1504 and proceeds to Step 1524. In Step 1524, the CPU 51 determines whether or not the ABS control start condition is established again in the same manner as Step 1325** (in other words, whether or not the second control cycle is started).

At the present moment, because it is immediately after the linear pressure increasing control in the first ABS control is started, the ABS control start condition is not established. Accordingly, the CPU 51 determines "No" in Step 1524 and proceeds to Step 1526. In Step 1526, the command current value Id (=Idlo) of the pressure increasing valve PU (PUlo) at the wheel  (=first front wheel lo) is determined on the basis of the pressure difference estimated value Pdiff (=Pdifflo) at this time (the starting point of the linear pressure increasing control at the present moment). The CPU 51 thus constitutes pressure increasing control means for executing the pressure increasing control.

Accordingly, the CPU 51 proceeds to Step 1528. In Step 1528, the pressure reducing valve PD (=PDlo) at the wheel  (=first front wheel lo) is operated so as to be closed, and the CPU 51 executes the duty control for the conducting electric current value in order to control the conducting electric current value of the pressure increasing valve PU(=PUlo) so as to be equal to the determined command current value Id (=Idlo). Thus, the linear pressure increasing control during the first ABS control for the wheel ** (=first front wheel lo) is started and executed.

Then, the CPU 51 proceeds to Step 1530. In Step 1530, a increased amount DP (=DPlo) (>0) of the wheel cylinder pressure estimated value Pw(=Pwlo) at the calculation cycle Δt during the linear pressure increasing control is calculated. At this point, a coefficient Kup is a value (a positive value) that corresponds to an increase slope of the wheel cylinder pressure at the wheel  during the linear pressure increasing control.

Then, the CPU 51 further proceeds to Step 1600 via Step 1532 and executes a routine illustrated in FIG. 16. After executing processes in Steps 1605 and 1610, the CPU 51 proceeds to Step 1615 and determines "No". Then, the CPU proceeds to Step 1595 in FIG. 15 via Step 1695. The CPU 51 repeats this process for the first front wheel lo until the ABS start condition is established again.

Accordingly, because the linear pressure increasing control of the first ABS control for the wheel  (=first front wheel lo) is continued and because the change amount DP (=DPlo) obtained in Step 1526 is positive, the wheel cylinder pressure estimated value Pw(=Pwlo) is increased, and the pressure difference estimated value Pdiff(=Pdifflo) is decreased.

Then, after the predetermined time passes, and the ABS control start condition for the wheel  (=first front wheel lo) is established again, the CPU 51 determines "Yes" in Step 1524 and proceeds to Step 1534. In Step 1534, the parameter CYCLE (=CYCLE lo) is increased by "1" (at the present moment, the CYCLE lo is changed from "1" to "2"), then the CPU 51 proceeds to Step 1536. In Step 1536, the parameter Mode**(=Modelo) is changed from "2" to "1".

As mentioned above, the first ABS control for the first front wheel lo is completed. Subsequently, when the CPU 51 determines "Yes" in Step 1502, it proceeds to Step 1504 and determines "Yes" again. Accordingly, the second ABS control is continuously started and executed for the first front wheel lo in the same manner as the first ABS control.

Then, a case where the ABS control start condition is established for the second front wheel hi (CYCLE hi=0, CYCLE lo≠0, SPRIT=1, YAW=1) as indicated at the time t13 in FIG. 9, while the first front wheel lo is under the ABS control and the second front wheel hi is under the yaw moment control as indicated at the time t12 in FIG. 9, will be explained.

In this case, the CPU 51 repeating the routine illustrated in FIG. 14 determines "Yes" in Step 1435 and changes the flag YAW from "1" to "0". Then, the CPU 51 proceeds to Step 1445. In Step 1445, a predetermined yaw moment control termination process is executed for the second front wheel hi. Thus, the yaw moment control for the second front wheel hi is terminated.

Then, the CPU 51 proceeds to Step 1450. In Step 1450, the CPU 51 determines whether or not the flag CYCLE lo is "0". When the CPU 51 determines "Yes", the CPU 51 proceeds to Step 1455 and sets the flag SPRIT to "0". Specifically, when the ABS control for the first front wheel lo is terminated, the flag SPRIT is set to "0".

At the present moment, because the ABS control for the first front wheel lo is continued (CYCLE lo=3 at the time t13 in FIG. 9), the CPU 51 determines "No" in Step 1450 and proceeds to Step 1495. Subsequently, because the flag YAW is "0", the CPU 51 determines "Yes" in Step 1405 and starts monitoring again whether or not the yaw moment control start condition in Step 1410 is established.

Figure 13:
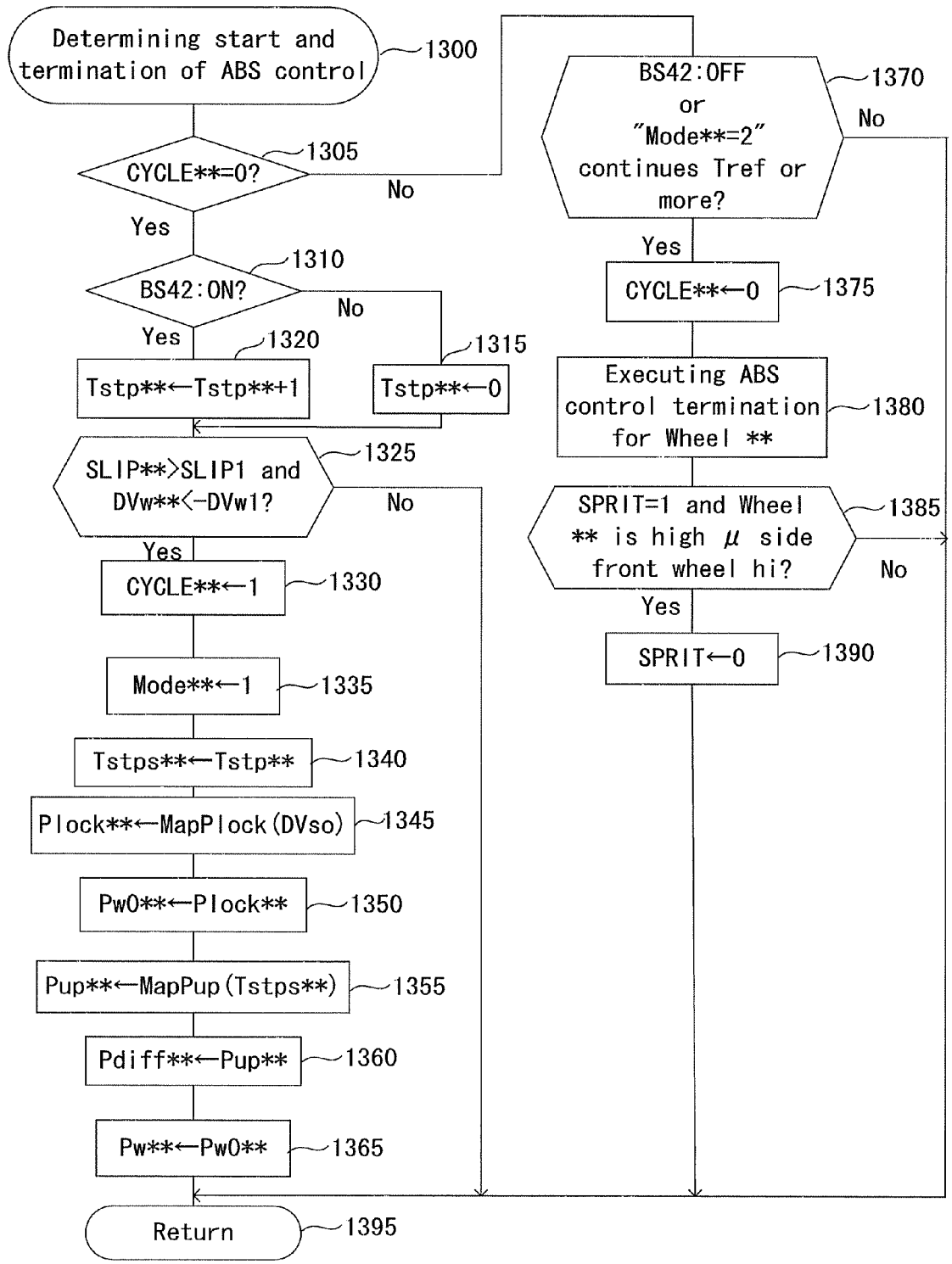
FIG. 13 illustrates a flowchart indicating a routine for determining a start and an end of the ABS control executed by the CPU illustrated in FIG. 1.

Further, in a case where the wheel  is the second front wheel hi, the CPU 51 repeating the routine illustrated in FIG. 13 at each wheel proceeds to Step 1325 and determines "Yes". Then, the CPU 51 executes processes in Steps 1330 through 1365 for the second front wheel hi. Accordingly, the flag CYCLE hi is changed from "0" to "1", the parameter Modehi is set to "1", and the wheel cylinder pressure estimated value Pw0hi is set to an initial value Pw0hi, which is set so as to be equal to the locking pressure Plockhi corresponding to the vehicle deceleration Dvso at the present moment. Further, the pressure difference estimated value Pdiffhi is formally set to an initial value Puphi. In the following explanation, it is assumed that the wheel  is the second front wheel hi.

Accordingly, the CPU 51 repeating the routine illustrated in FIG. 15 for each wheel determines "Yes" in Steps 1502 and 1504 and executes processes in and after Steps 1506 for the second front wheel hi.

Accordingly, the pressure reducing control of the first ABS control for the second front wheel hi is started. In other words, the ABS control for the second front wheel hi is started in addition to the executing ABS control for the first front wheel lo.

Accordingly, the wheel cylinder pressure estimated value Pw(=Pwhi) is reduced through the process in Step 1605. Further, the pressure difference estimated value Pdiff (=Pdiffhi) is formally increased through the process in Step 1610. In this stage, because the parameter Modehi is "1", the CPU 51 determines "No" in Step 1620.

Then, after a predetermined time passes and the pressure increasing control start condition is established for the wheel  (=second front wheel hi) (see the time t14 in FIG. 9), the CPU 51 proceeds to Step 1512 in FIG. 15 and determines "Yes". Then, the CPU 51 proceeds to Step 1514 and changes the parameter Mode(=Modehi) from "1" to "2". Then, the CPU 51 proceeds to Step 1516 and determines whether or not conditions in Step 1516 are fulfilled.

At the present moment, the flag SPRIT is "1", the wheel ** is the second front wheel hi, and the flag CYCLE hi=1. Accordingly, the CPU 51 determines "Yes" in Step 1516 and proceeds to Step 1518. In Step 1518, a pressure difference estimated value Pdifflo at the first front wheel lo at the present moment updated in Step 1610, the wheel cylinder pressure estimated values Pwhi and Pwlo at the second front wheel hi and the first front wheel lo, and the second front wheel pressure difference estimated initial value Pdiffhi0 are calculated on the basis of the formula (7). The CPU 51 thus constitutes pressure difference at specific time calculating means for calculating a pressure difference estimated value at a specific time.

Then, the CPU 51 proceeds to Step 1520 and sets the pressure difference estimated value Pdiffhi to be the second front wheel pressure difference estimated initial value Pdiffhi0. This means that the pressure difference estimated value Pdiff**(=Pdiffhi), which has been updated in Step 1610 by the present moment (from the time t13 to the time t14 in FIG. 9), is actually not used.

Then, the CPU 51 proceeds to Step 1522. In Step 1522, the CPU 51 initializes a counter Tuphi to "0" and set the flag SEARCH to "0". At this point, the counter Tuphi indicates a continuation time of the linear pressure increasing control during the first ABS control for the second front wheel hi. The flag SEARCH being "0" indicates a state for allowing the execution of the pressure difference reducing process, and the flag SEARCH being "1" indicates a state for prohibiting the executing the pressure difference reducing process.

As a result, because the parameter Mode**(=Modehi) is set to "2", the CPU 51 determines "No" in Step 1504 and starts and executes the linear pressure increasing control during the first ABS control for the second front wheel hi.

Accordingly, through the process in Step 1605 in the routine illustrated in FIG. 16, which is executed via Step 1532, the wheel cylinder pressure estimated value Pw(=Pwhi) is increased, and the pressure difference estimated value Pdiff(=Pdiffhi) is reduced by the process in the following Step 1610.

Further, at the present moment, because the linear pressure increasing control during the first ABS control for the second front wheel hi is executed, the flag SPRIT is set to "1", the wheel ** is set to be equal to second front wheel hi, the flag CYCLE hi is set to "1", and the Modehi is set to "2". Accordingly, the CPU 51 determines "Yes" in Steps 1615 and 1620 and starts a routine for executing a Pdiffhi increasing and decreasing process illustrated in FIG. 17 from Step 1700 via Step 1625.

Specifically, in Step 1705, the CPU 51 determines whether or not the flag SEARCH is "0", and when it determines "No", the CPU 51 directly proceeds to Step 1795. At the present moment, because the flag SEARCH is previously set to "0" through the process in Step 1522, the CPU 51 determines "Yes" in Step 1705 and proceeds to Step 1710. In Step 1710, the CPU 51 determines whether or not the slip amount SLIPhi of the second front wheel hi is larger than the SLIP3.

At the present moment, because it is immediately after the start of the linear pressure increasing control during the first ABS control for the second front wheel hi, the slip amount SLIPhi is smaller than SLIP3 (slip amount SLIPhi<SLIP3) (see the time t24 in FIG. 10 and the time t34 in FIG. 11). Accordingly, the CPU 51 determines "No" in Step 1710 and proceeds to Step 1715. In Step 1715, the CPU 51 determines whether or not the condition in Step 1715 (corresponding to the second condition) is established. At this point, the value Tup2 corresponds to the predetermined first time period T2.

When the CPU 51 determines "Yes" in Step 1715 (see the time t34C in FIG. 11), it proceeds to Step 1720. In Step 1720, an increasing value P2 is determined on the basis of the wheel acceleration DVwhi at the present moment previously calculated in Step 1220 and the predetermined function funcP2. Then, the CPU 51 proceeds to Step 1725. In Step 1725, the pressure difference estimated value Pdiffhi is corrected by adding the increasing value P2 to the pressure difference estimated value Pdiffhi at the present moment, and the CPU 51 proceeds to Step 1735. Specifically, the pressure difference increasing process is executed. On the other hand, when the CPU 51 determines "No" in Step 1715, the CPU 51 directly proceeds to Step 1730 without executing the pressure difference increasing process.

In Step 1730, the CPU 51 determines whether or not the counter Tuphi is a multiple number of a value Tup1. The value Tup1 corresponds to the predetermined time T1. When the CPU 51 determines "Yes" in Step 1730, it proceeds to Step 1735 and corrects the pressure difference estimated value Pdiffhi by subtracting the subtraction valueP1 from the pressure difference estimated value Pdiffhi at the present moment.

Specifically, the pressure difference reducing process is executed. Then, the CPU 51 proceeds to Step 1740. On the other hand, when the CPU 51 determines "No" in Step 1730, the CPU 51 directly proceeds to Step 1740 without executing the pressure difference reducing process.

Figure 17:
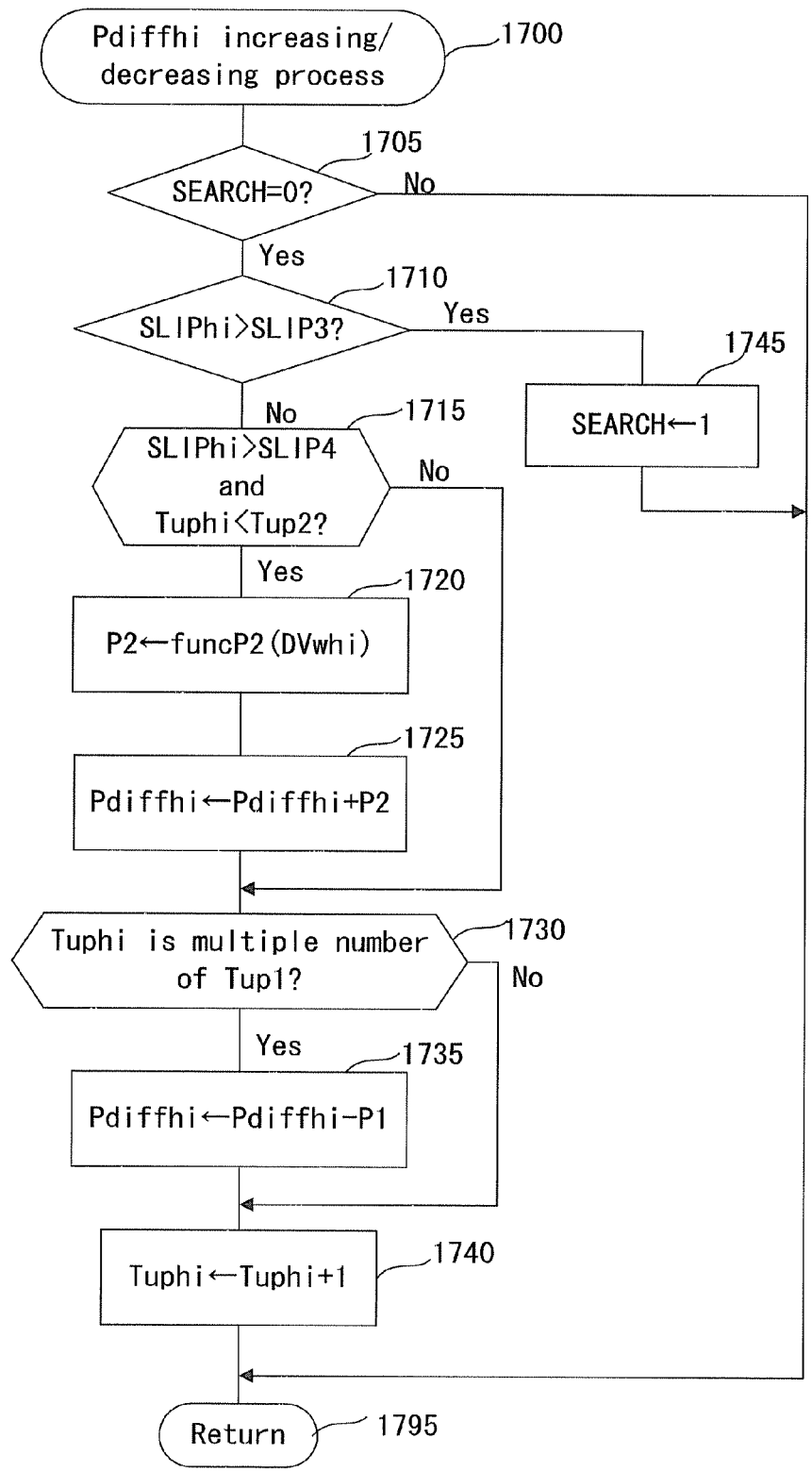
FIG. 17 illustrates a flowchart indicating a routine for executing the pressure difference reducing process and the pressure difference increasing process by the CPU illustrated in FIG. 1.

In Step 1740, the CPU 51 adds 1 to the counter Tuphi and then proceeds to Step 1595 via Step 1795 in FIG. 17 and Step 1695 in FIG. 16.

Subsequently, until the condition in Step 1710 is established while the linear pressure increasing control is executed during the first ABS control for the second front wheel hi, the pressure difference estimated value Pdiffhi is repeatedly updated (reduced) through the process in Step 1610 in FIG. 16, at the same time, the pressure difference increasing process and the pressure difference reducing process are appropriately executed through the routine in FIG. 17 in order to correct the pressure difference estimated value Pdiffhi. Then, when the condition in Step 1710 is established (see the time t24B in FIG. 10 and the time t34B in FIG. 11), the CPU 51 determines "Yes" in Step 1710 and proceeds to Step 1745. In Step 1745, the CPU 51 changes the flag SEARCH from "0" to "1".

Subsequently, the CPU 51 determines "No" in Step 1705. Accordingly, in the later processes, the pressure difference increasing process and the pressure difference reducing process are not executed while the linear pressure increasing control is executed during the first ABS control.

Further, when the linear pressure increasing control during the second or later ABS control for the second front wheel hi is executed, because the flag CYCLE hi is equal to or more than "2", the condition in Step 1615 in FIG. 16 is not established. Accordingly, in the linear pressure increasing control during the second or later ABS control for the second front wheel hi, the pressure difference booting process and the pressure difference reducing process are not executed. In other words, the pressure difference increasing process and the pressure difference reducing process are executed only when the linear pressure increasing control during the first ABS control is executed for the second front wheel hi.

Thus, the operations of the CPU 51 are continued until the ABS control termination condition in Step 1370 for the second front wheel hi or the first front wheel lo is established in the routine illustrated in FIG. 13, in which the processes in Steps 1305 and 1370 are repeated.

On the other hand, when the driver completes the operation of the brake pedal BP during the above-mentioned operation, or when the conditions in Step 1370 for the wheel  is established, for example, when the parameter Mode(=Modehi) for the second front wheel hi being "2" continues for the time Tref or more, The CPU 51 determines "Yes" in Step 1370 and proceeds to Step 1375. In Step 1375, the CPU 51 changes the value of the parameter CYCLE  being other than "0" so as to be "0". Thus, a sequence of executing ABS control for the wheel  is terminated.

Then, the CPU 51 proceeds to Step 1385 and determines whether or not the conditions in Step 1385 are established. Specifically, it is determined whether or not the ABS control for the second front wheel hi is terminated. When the CPU 51 determines "Yes" in Step 1385, the CPU 51 proceeds to Step 1390 and changes the flag SPRIT from "1" to "0". Thus, the classification of the front two wheels is cancelled.

Sequentially, the CPU 51 proceeds to Step 1502 in FIG. 15 for the wheel  at which the ABS control is terminated. In Step 1502, the CPU 51 determines "No" and proceeds to Step 1595. As a result, the ABS control for the wheel  is not executed. Further, the CPU 51 determines "Yes" for the wheel  in Step 1305 and proceeds to Step 1325 again. In Step 1325, the CPU 51 monitors whether or not the ABS control start condition for the wheel  is established.

As mentioned above, the brake hydraulic pressure control apparatus for a vehicle described in the embodiment related to the disclosed subject matter employs a normally opened linear solenoid valve as the pressure increasing valve PU and a normally closed solenoid valve as the pressure reducing valve PD. Using the normally opened linear solenoid valve, the conducting electric current value is linearly controlled by the duty control. Further, the brake hydraulic pressure control apparatus for a vehicle repeats the ABS control comprised of the pressure reducing control and the linear pressure increasing control for the wheel at which the ABS control start condition is established.

The device calculates and updates the wheel cylinder pressure estimated value Pw for the wheel under the ABS control on the basis of the formula (3) (Pw=Pw0+ΣDP). Further, the device calculates and updates the pressure difference estimated value Pdiff, which is an estimation of the pressure difference between the master cylinder pressure Pm and the wheel cylinder pressure, on the basis of the formula (4) (Pdiff=Pup−ΣDP). For the wheel under the ABS control, the device determines a command current value Id  at the pressure increasing valve PU at which the linear pressure increasing control is executed, by use of the pressure difference estimated value Pdiff**.

At this point, while the first front wheel lo is under the ABS control and the second front wheel hi is under the yaw moment control, when the brake fluid pressure control for the second front wheel is changed from the yaw moment control to the ABS control, the device calculates and updates a pressure difference estimated value Pdiffhi for the second front wheel hi by use of the formula (5) (Pdiffhi=Pdiffhi0+ΣDP) and the formula (7) (Pdiffhi0=Pdifflo−(Pwhi−Pwlo)*h+P0) instead of the formula (4).

Thus, because the pressure difference estimated value Pdiffhi is calculated and updated by use of the wheel cylinder pressure estimated value Pwlo at the first front wheel and the pressure difference estimated value Pdifflo at the first front wheel, which are calculated by repeated calculations and updating so as to have a high estimation accuracy, the pressure difference estimated value Pdiffhi at the second front wheel is estimated more accurately comparing to a case where the formula (4) is used.

The disclosed subject matter is not limited to this embodiment and may be varied within a scope of the present invention. For example, in the embodiment, the starting point (the time t14 in FIG. 9) of the linear pressure increasing control during the first ABS control for the second front wheel is used for the "specific time", however, the starting point of the first ABS control for the second front wheel (that is, the starting point of the pressure reducing control during the first ABS control, the time t13 in FIG. 9) may be used as the "specific time" alternatively.

In this case, the second front wheel pressure difference estimated initial value Pdiffhi0 is calculated at the starting point of the first ABS control for the second front wheel by use of the formula (7) (or the formula (6)), and using the second front wheel pressure difference estimated initial value Pdiffhi0, a pressure difference estimated value Pdiffhi after the starting point of the first ABS control for the second front wheel is calculated and updated by use of the formula (5).

Alternatively, after the starting point of the first ABS control for the second front wheel, the second front wheel pressure difference estimated initial value Pdiffhi0 is calculated each time by use of the formula (7) (or the formula (6)), at the same time, the pressure difference estimated value Pdiffhi for the second front wheel may be determined so as to be equal to the second front wheel pressure difference estimated initial value Pdiffhi0. In this case, the "specific time" corresponds to an entire period from the starting point of the pressure reducing control of the first ABS control for the second front wheel to the ending point of the ABS control for the second front wheel.

Further, in the embodiment, the second front wheel pressure difference estimated initial value Pdiffhi0 is calculated by use of the formula (7) (Pdiffhi0=Pdifflo−(Pwhi−Pwlo)*h+ P0), however, the second front wheel pressure difference estimated initial value Pdiffhi0 may be calculated by use of the formula (7), in which one of/both of the coefficient h and the value P0 is/are abbreviated. The coefficient h may be a function of the vehicle deceleration Dvso.

Further, according to the embodiment, when the slip amount SLIPhi at the second wheel hi exceeds the value SLIP3 (corresponding to the first condition), the pressure difference reducing process is terminated, however, in consideration of the increase of the vehicle deceleration Dvso in accordance with the increase of the slip amount SLIPhi, the pressure difference reducing process may be terminated when the vehicle deceleration Dvso exceeds a predetermined value. Further, the pressure difference reducing process may be terminated when the "vehicle wheel deceleration−DVwhi" at the second front wheel hi exceeds a predetermined value. In the same way, instead of the condition "SLIPhi>SLIP4" for executing the pressure difference increasing process (Step 1715 in FIG. 17), a condition "−DVwhi>predetermined value" may alternatively be used.

Further, in the embodiment, the ABS control comprised of the pressure reducing control and the linear pressure increasing control is repeated, however, a ABS control comprised of the pressure reducing control, the sustaining control and the linear pressure increasing control may be repeated alternatively.

Further, in the embodiment, during the pressure reducing control, the pressure reducing amount of the wheel cylinder pressure estimated value Pw is calculated at each cycle Δt of the program execution, however, a total reducing amount (total pressure reducing amount) of the wheel cylinder pressure estimated value Pw within a continuation time of the pressure reducing control by use of the table illustrated in FIG. 8.

Figure 18:
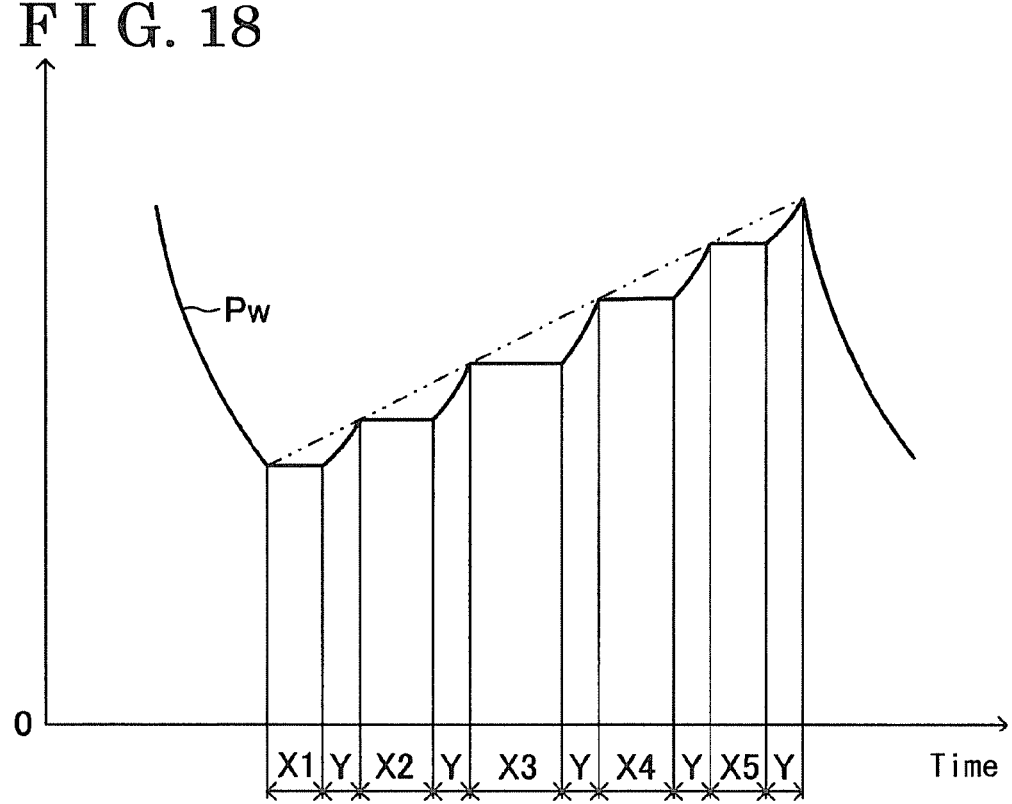
FIG. 18 illustrates a graph indicating an example of an open/close pattern of the pressure increasing valve when an open/close pressure increasing control is executed in a case where a solenoid valve is used as the pressure increasing valve.

Further, in the present embodiment, the (normally opened) linear solenoid valve PU is used as the pressure increasing valve, however, the (normally opened) solenoid valve may alternatively be used as the pressure increasing valve. In this case, as illustrated in FIG. 18, instead of the linear pressure increasing control, an open/close pressure increasing control for alternately repeating an opening operation and a closing operation (alternately repeating a increasing time period and a sustaining time period) is executed. An open/close pattern of the pressure increasing valve during the open/close pressure increasing control is determined on the basis of the pressure difference estimated value Pdiff.

Figure 19:
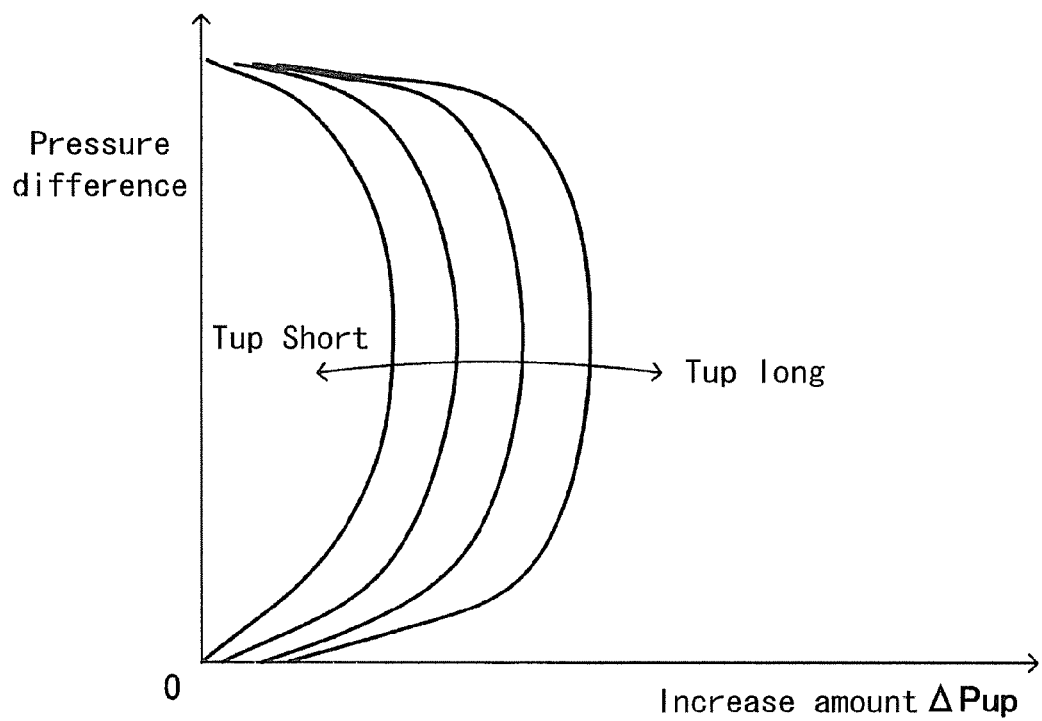
FIG. 19 illustrates a graph indicating a relation among a time period, a pressure difference between the master cylinder pressure and the wheel cylinder pressure and the increase amount of the wheel cylinder pressure, during the solenoid valve serving as the pressure increasing valve is maintained in an opened state.

Specifically, as illustrated in FIG. 19, the increased amount ΔPup of the wheel cylinder pressure generated by the opening operation of the pressure increasing valve serving as a solenoid valve during the open/close pressure increasing control is determined on the basis of the pressure difference between the master cylinder pressure and the wheel cylinder pressure and the time period Tup in which the pressure increasing valve is maintained to be in an opened state. Such characteristic of the pressure increase at the pressure increasing valve can be obtained in advance by conducting a predetermined test and a simulation.

Thus, for example, setting the increasing time period during the open/close pressure increasing control to be a time period Y (constant), by use of the time period Y, the pressure difference estimated value Pdiff at the starting point of the open/close pressure increasing control (accordingly, the ending point executing the pressure reducing control), and the table illustrated in FIG. 19, the increased amount at the wheel cylinder pressure during the pressure increasing time period can be calculated. Thus, on the basis of the wheel cylinder pressure estimated value Pw at the starting point of the open/close pressure increasing control (accordingly, the ending point of the executing pressure reducing control) and the increased amount of the wheel cylinder pressure during the pressure increasing time period, the wheel cylinder pressure Pw increasing so as to form a step shape during the open/close pressure increasing control can be estimated.

As a result, sustaining time periods (times X1 through X5) are set in a manner where a ratio of the increased amount of the wheel cylinder pressure during one pressure increasing time period relative to a total of one sustaining time period and the one pressure increasing time period following the sustaining time period (namely an average increase slope of the wheel cylinder pressure) agrees the increase slope (a value corresponding to the value Kup in Step 1530 in FIG. 15**) of the wheel cylinder pressure when the linear pressure increasing control is executed by means of the linear solenoid valve. Thus, a characteristic of the pressure increase of the wheel cylinder pressure, which is approximately equal to that in the linear pressure increasing control executed by the linear solenoid valve during the open/close pressure increasing control, can be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A brake hydraulic pressure control apparatus for a vehicle comprising:
   anti-skid control means for executing an anti-skid control for at least two front wheels respectively and independently for multiple times continuously, the anti-skid control alternately executing a pressure reducing control and a pressure increasing control for at least one of the front wheels at which an anti-skid control start condition is established, the pressure reducing control reducing a wheel cylinder pressure within a wheel cylinder and the pressure increasing control increasing the wheel cylinder pressure within the wheel cylinder;
   yaw moment control means for executing a yaw moment control, while the anti-skid control has been executed only for a first front wheel, for a second front wheel, at which the anti-skid control has not been executed, in order to restrain increase of the wheel cylinder pressure, the first front wheel being one of the front wheels, and the second front wheel being the other one of the front wheels;
   wheel cylinder pressure estimated value calculating means for calculating a wheel cylinder pressure estimated value at the wheel, where the anti-skid control has been executed, while the anti-skid control is being executed;

pressure difference estimated value calculating means for calculating a pressure difference estimated value between a master cylinder pressure and the wheel cylinder pressure at the wheel where the anti-skid control has been executed, on the basis of at least the calculated wheel cylinder pressure estimated value;

pressure increasing control means for executing the pressure increasing control;

state determining means for determining a one-wheel-in-anti-skid-control state in which the anti-skid control is executed to the first front wheel and the yaw moment control is executed at the second front wheel, and a both-front-wheels-in-anti-skid-control state in which the anti-skid control is executed at the first front wheel and the anti-skid control is also started to be executed to the second front wheel, in addition to the first front wheel, in response to a fulfillment of the anti-skid control start condition, wherein the pressure difference estimated value calculating means includes pressure difference at specific time calculating means for calculating a pressure difference estimated value at specific time, which is a pressure difference estimated value of the second front wheel at a specific time, while the both-front-wheels-in-anti-skid-control state is established, the pressure difference at specific time calculating means obtains the pressure difference estimated value at specific time in a manner where the pressure difference at specific time calculating means calculates a wheel cylinder pressure difference, which corresponds to a difference between the wheel cylinder pressure estimated value of the first front wheel obtained while the one-wheel-in-anti-skid-control state is established and the wheel cylinder pressure estimated value of the second front wheel obtained while the both-front-wheels-in-anti-skid-control state is established, and subtracts the calculated wheel cylinder pressure difference from the pressure difference estimated value of the first front wheel obtained by the pressure difference estimated value calculating means, the pressure increasing control means executes the pressure increasing control at the first front wheel on the basis of the pressure difference estimated value obtained by the pressure difference estimated value calculating means while the one-wheel-in-anti-skid-control state is established, and the pressure increasing control means executes the pressure increasing control at the first front wheel on the basis of the pressure difference estimated value obtained by the pressure difference estimated value calculating means and at the second front wheel on the basis of the pressure difference estimated value at specific time obtained by the pressure difference estimated value at specific time calculating means while the both-front-wheels-in-anti-skid-control state is established.

2. The brake hydraulic pressure control apparatus for vehicle according to claim 1, wherein the pressure difference at specific time calculating means calculates the pressure difference estimated value at specific time, on the basis of the pressure difference estimated value at the first front wheel and a value corresponding to the wheel cylinder pressure difference and being smaller than the wheel cylinder pressure difference.

3. The brake hydraulic pressure control apparatus for vehicle according to claim 1, wherein the pressure difference at specific time calculating means sets the pressure difference estimated value at specific time by adding a predetermined addition value thereto.

4. The brake hydraulic pressure control apparatus for vehicle according to claim 3, wherein
the pressure difference estimated value calculating means executes a pressure difference reducing process during the pressure increasing control for the second front wheel after the specific time in the both front wheels anti-skid control state, the pressure difference reducing process setting the pressure difference estimated value at the second front wheel by subtracting a predetermined subtraction value therefrom, each time a predetermined time passes.

5. The brake hydraulic pressure control apparatus for vehicle according to claim 4, wherein the pressure difference estimated value calculating means terminates the pressure difference reducing process when a slipping level at the second front wheel rises, or a first condition related to increase of deceleration of the vehicle is detected.

6. The brake hydraulic pressure control apparatus for vehicle according to claim 3, wherein the pressure difference estimated value calculating means executes a pressure difference increasing process for setting the pressure difference estimated value at the second front wheel by adding a predetermined increasing value, when a second condition related to the rise of the slipping level at the second front wheel is detected before a predetermined first time period passes from the specific time, during the pressure increasing control for the second front wheel after the specific time, while the wheels are in the both front wheels anti-skid control state.

7. The brake hydraulic pressure control apparatus for vehicle according to claim 6, wherein the pressure difference estimated value calculating means sets the increasing value on the basis of the vehicle wheel deceleration at the second front wheel.

8. The brake hydraulic pressure control apparatus for vehicle according to claim 1, wherein the pressure difference at specific time calculating means calculates the pressure difference estimated value at the second front wheel at a starting point of the pressure increasing control during the first anti-skid control for the second front wheel, as the pressure difference estimated value at specific time.

9. The brake hydraulic pressure control apparatus for vehicle according to claim 1, wherein the wheel cylinder pressure estimated value calculating means includes a wheel cylinder pressure estimated initial value calculating means for calculating a wheel cylinder pressure estimated initial value, which is the wheel cylinder pressure estimated value at a starting point of the first anti-skid control, and the wheel cylinder pressure estimated value calculating means calculates the wheel cylinder pressure estimated value, which varies during the anti-skid control, by use of at least the calculated wheel cylinder pressure estimated initial value.

10. The brake hydraulic pressure control apparatus for vehicle according to claim 9, wherein the wheel cylinder pressure estimated initial value calculating means calculates the wheel cylinder pressure estimated initial value in consideration of a wheel cylinder pressure at which a wheel locking occurs, the wheel cylinder pressure at which the wheel locking occurs being calculated on the basis of the vehicle deceleration of the vehicle.

11. The brake hydraulic pressure control apparatus for vehicle according to claim 9, wherein the pressure difference estimated value calculating means calculates the pressure difference estimated value on the basis of the wheel cylinder pressure estimated initial value and the wheel cylinder pressure estimated value.

12. The brake hydraulic pressure control apparatus for vehicle according to claim 11, wherein the pressure difference estimated value calculating means sets the pressure difference estimated value by adding an additional pressure value thereto, the additional pressure value corresponding to a time period from a starting point of a braking operation executed by a driver to a starting point when the anti-skid control is started.

13. A brake hydraulic pressure control apparatus for a vehicle, which is applied to a control unit having: a pressure increasing valve serving as a solenoid valve provided at a first hydraulic pressure circuit existing between a wheel cylinder and a master cylinder, which generates a master cylinder pressure on the basis of a braking operation executed by a driver; and a pressure reducing valve serving as the solenoid valve provided at a second hydraulic pressure circuit existing between the wheel cylinder and a reservoir, comprising:

anti-skid control means for executing an anti-skid control for at least two front wheels respectively and independently for multiple times continuously, the anti-skid control alternately executing a pressure reducing control and a pressure increasing control for at least one of the front wheels at which an anti-skid control start condition is established, the pressure reducing control reducing a wheel cylinder pressure within a wheel cylinder by controlling the pressure increasing valve and the pressure reducing valve and the pressure increasing control increasing the wheel cylinder pressure within the wheel cylinder, after the pressure reducing control is executed, by controlling the pressure increasing valve, while the pressure reducing valve is maintained in a closed state;

yaw moment control means for executing a yaw moment control, when a yaw moment control start condition including a case where the anti-skid control is executed only for a first front wheel is established, for a second front wheel, at which the anti-skid control has not been executed, in order to restrain increase of the wheel cylinder pressure, the first front wheel being one of the front wheels, and the second front wheel being the other one of the front wheels by controlling the pressure increasing valve and the pressure reducing valve;

the anti-skid control means including wheel cylinder pressure estimated value calculating means for calculating a wheel cylinder pressure estimated value at the wheel, where the anti-skid control has been executed, while the anti-skid control is being executed, pressure difference estimated value calculating means for calculating a pressure difference estimated value between a master cylinder pressure and the wheel cylinder pressure at the wheel where the anti-skid control has been executed, on the basis of at least the calculated wheel cylinder pressure estimated value, and pressure increasing control means for controlling the pressure increasing valve during the pressure increasing control;

state determining means for determining a one-wheel-in-anti-skid-control state in which the anti-skid control is executed to the first front wheel and the yaw moment control is executed at the second front wheel, and a both-front-wheels-in-anti-skid-control state in which the anti-skid control is executed at the first front wheel and the anti-skid control is also started to be executed to the second front wheel, in addition to the first front wheel, in response to a fulfillment of the anti-skid control start condition, wherein the pressure difference estimated value calculating means including includes pressure difference at specific time calculating means for calculating a pressure difference estimated value at specific time, which is a pressure difference estimated value of the second front wheel at a specific time, while the both-front-wheels-in-anti-skid-control state is established, the pressure difference at specific time calculating means obtains the pressure difference estimated value at specific time in a manner where the pressure difference at specific time calculating means calculates a wheel cylinder pressure difference, which corresponds to a difference between the wheel cylinder pressure estimated value of the first front wheel obtained while the one-wheel-in-anti-skid-control state is established and the wheel cylinder pressure estimated value of the second front wheel obtained while the both-front-wheels-in-anti-skid-control state is established, and subtracts the calculated wheel cylinder pressure difference from the pressure difference estimated value of the first front wheel obtained by the pressure difference estimated value calculating means, the pressure increasing control means executes the pressure increasing control at the first front wheel on the basis of the pressure difference estimated value obtained by the pressure difference estimated value calculating means while the one-wheel-in-anti-skid-control state is established, and the pressure increasing control means executes the pressure increasing control at the first front wheel on the basis of the pressure difference estimated value obtained by the pressure difference estimated value calculating means and to the second front wheel on the basis of the pressure difference estimated value at specific time obtained by the pressure difference estimated value at specific time calculating means while the both-front-wheels-in-anti-skid-control state is established.

14. The brake hydraulic pressure control apparatus for vehicle according to claim 13, wherein the pressure increasing valve is a linear solenoid valve for linearly adjusting the pressure difference between the master cylinder pressure and the wheel cylinder pressure in accordance with a conducting electric current value of the pressure increasing valve, and the pressure increasing valve control means determines the conducting electric current value at the pressure increasing valve during the pressure increasing control on the basis of the pressure difference estimated value.

* * * * *